United States Patent
Gandhi et al.

(10) Patent No.: US 11,698,907 B2
(45) Date of Patent: Jul. 11, 2023

(54) SYSTEM AND METHOD FOR PROCESSING OF EVENTS

(71) Applicant: Cogility Software Corporation, Irvine, CA (US)

(72) Inventors: Pauli Gandhi, Naperville, IL (US); Michael Allen Latta, Greeley, CO (US)

(73) Assignee: Cogility Software Corporation, Irvine, CA (US)

( * ) Notice: Subject to any disclaimer, the term of this patent is extended or adjusted under 35 U.S.C. 154(b) by 113 days.

(21) Appl. No.: 17/446,924

(22) Filed: Sep. 3, 2021

(65) Prior Publication Data

US 2021/0397621 A1    Dec. 23, 2021

Related U.S. Application Data

(63) Continuation-in-part of application No. 16/289,039, filed on Feb. 28, 2019, now Pat. No. 11,126,478.

(Continued)

(51) Int. Cl.
| | |
|---|---|
| *G06F 7/06* | (2006.01) |
| *G06F 16/2455* | (2019.01) |
| *G06F 16/242* | (2019.01) |
| *G06F 9/54* | (2006.01) |
| *G06F 16/22* | (2019.01) |
| *G06F 16/2458* | (2019.01) |

(52) U.S. Cl.
CPC ........ *G06F 16/24565* (2019.01); *G06F 9/542* (2013.01); *G06F 16/2246* (2019.01); *G06F 16/242* (2019.01); *G06F 16/2468* (2019.01)

(58) Field of Classification Search
CPC .............. G06F 16/24565; G06F 9/542; G06F 16/2246; G06F 16/242; G06F 16/2468; G06F 16/2465; G06F 16/24568
See application file for complete search history.

(56) References Cited

U.S. PATENT DOCUMENTS

| | | | |
|---|---|---|---|
| 8,590,021 B2 | 11/2013 | Steeves et al. | |
| 10,305,758 B1 * | 5/2019 | Bhide | ................. G06F 11/3409 |

(Continued)

OTHER PUBLICATIONS

International Search Report and Written Opinion of the International Searching Authority; International Application No. PCT/US2022/042519; dated Jan. 3, 2023; 14 pp. total.

(Continued)

*Primary Examiner* — Andy Ho
*Assistant Examiner* — Abdou K Seye
(74) *Attorney, Agent, or Firm* — Womble Bond Dickinson (US) LLP

(57) ABSTRACT

Systems and methods for processing events are disclosed. Event data comprising passive event data, active event data, or both is received. It is determined whether the received event data is available for a pattern of passive event data and active event data. In response to determining that the received event data is available for the pattern of passive event data and active event data, one or more constraints between the passive event data and the active event data are converted into one or more query terms. The query terms are used to construct at least one query. Remaining passive event data that is related to some, but not all, of the active event data is obtained using the constructed at least one query.

22 Claims, 18 Drawing Sheets

Related U.S. Application Data

(60) Provisional application No. 62/636,624, filed on Feb. 28, 2018.

(56) References Cited

U.S. PATENT DOCUMENTS

| | | | |
|---|---|---|---|
| 11,050,778 | B2 | 6/2021 | Paturi et al. |
| 11,113,274 | B1* | 9/2021 | Thiel .................... G06F 16/242 |
| 2008/0294644 | A1 | 11/2008 | Liu et al. |
| 2011/0137942 | A1* | 6/2011 | Yan .................. G06F 16/24568 |
| | | | 707/E17.039 |
| 2013/0325787 | A1 | 12/2013 | Gerken et al. |
| 2017/0177765 | A1 | 6/2017 | Dusanapudi et al. |
| 2017/0351511 | A1* | 12/2017 | Bar-Or ..................... G06F 8/34 |
| 2018/0136987 | A1 | 5/2018 | He et al. |
| 2019/0205773 | A1 | 7/2019 | Ackerman et al. |
| 2019/0228309 | A1 | 7/2019 | Yu et al. |
| 2019/0266030 | A1 | 8/2019 | Latta |

OTHER PUBLICATIONS

Timothy K Shih et al., "Solving Temporal Constraint Networks with Qualitative Reasoning and Fuzzy Rules", Proceedings of the 1999 International Conference on Parallel Processing, Sep. 21-24, 1999, 8 pages total.

* cited by examiner

```
{
    name: "Template1",
    description: "sample template with one group and an action",
    assertions: [
        {
            id: "11111",
            type: "event",
            args: {
                event_id: "xxxxx",
                min: 1,
                max: nil
            }
        },
        {
            id: "22222",
            type: "event",
            args: {
            event_id: "yyyy",
            min: 1,
            max: nil
            }
        },
        {
            id: "33333",
            type: "event",
            args: {
                event_id: "zzzz",
                min: 0,
                max: 0
            }
        }
    ],
```

groups: [
        {
                id: "4444",
                encloses: [
                {type: "assertion",
                id: "11111"},
                {type: "assertion",
                id: "22222"},
                type: "assertion",
                id: "33333"}
                ]
        }
    ],
    outcomes: [
        {
                type: "CEP.Actions.PublishEvent",
                id: "55555",
                args: {
                        event_type: "qqqq",
                        mapping: {
                                "11111.loc": "where",
                                "22222.dtg": "when"
                        }
                }
        }
    ]
}
```

FIG. 6B

SYSTEM AND METHOD FOR PROCESSING OF EVENTS

CROSS REFERENCE TO RELATED APPLICATIONS

This application is a continuation-in-part of U.S. patent application Ser. No. 16/289,039 filed Feb. 28, 2019, now U.S. Pat. No. 11,126,478 which claims the benefit of U.S. Provisional Application No. 62/636,624 filed on Feb. 28, 2018, the disclosures of which are incorporated herein by reference.

FIELD OF THE INVENTION

Embodiments of the present disclosure relate generally to event processing. More particularly, embodiments of the disclosure relate to systems and methods for hierarchical complex event processing (H-CEP).

BACKGROUND

Security of governments, businesses, organizations, and individuals has become increasingly important as such security has been increasingly compromised by a number of individuals and groups. It is therefore important to have security measures that are able to timely and effectively process information that is useful in detecting and preventing potential threats as well as responding to threats that are in the development stage.

With the availability of massive amounts of data from a number of sources, such as transaction systems, social networks, web activity, history logs, etc., it has become a necessity to use data technologies for mining and correlating useful information. Stream processing approaches and event-based systems, which incorporate complex event processing (CEP), have been widely accepted as solutions for handling big data in a number of application areas. CEP refers to a detection of events that have complex relationships, often including a temporal or geographic component.

Unfortunately, current CEP systems have shortcomings such as the assumption that input data is obtained from similar data sources or that the data structure and schema does not often change.

BRIEF DESCRIPTION OF THE DRAWINGS

Embodiments of the disclosure are illustrated by way of example and not limitation in the figures of the accompanying drawings in which like references indicate similar elements.

FIGS. 6A and 6B illustrate a representation of a template in JavaScript Object Notation (JSON) according to one embodiment.

DETAILED DESCRIPTION

Figure 1A:
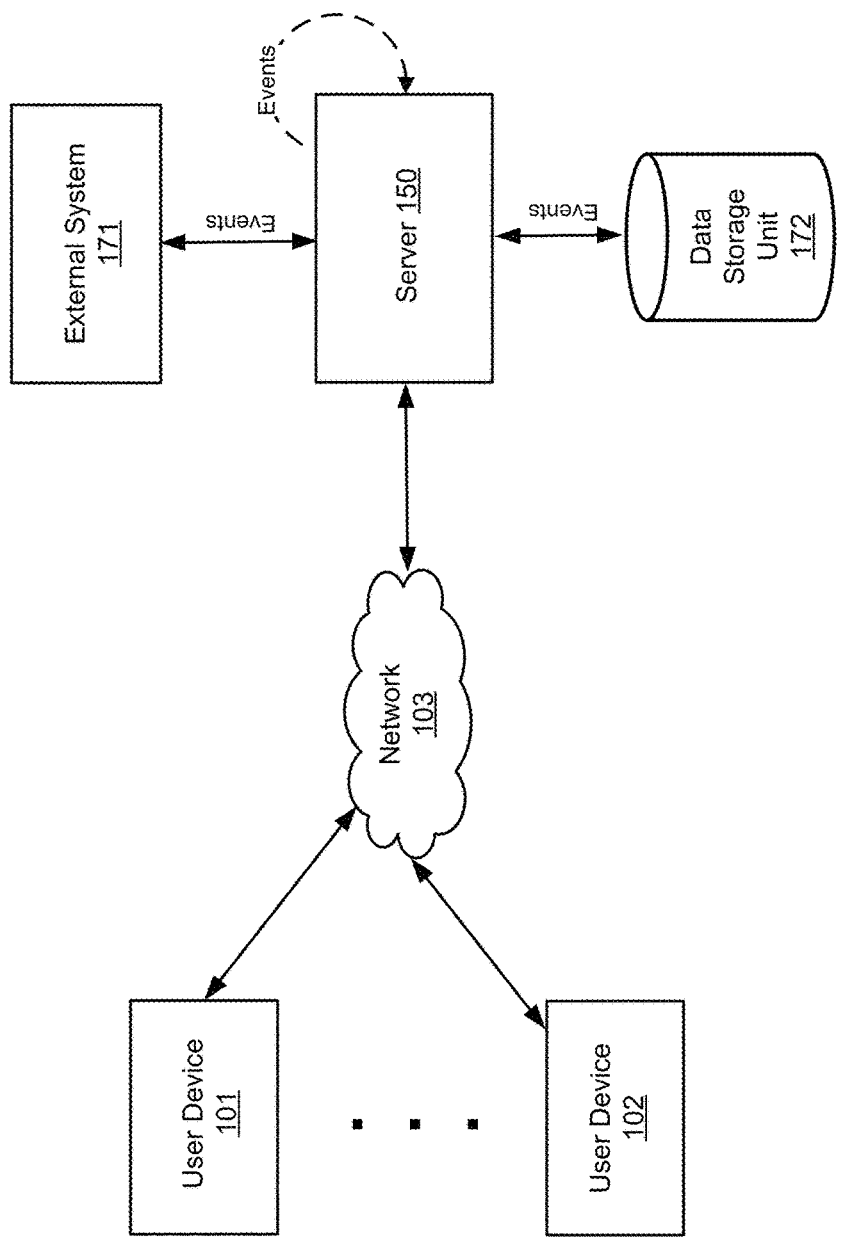
FIGS. 1A and 1B are block diagrams illustrating an event processing system according to one embodiment.

Various embodiments and aspects of the disclosure will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As used herein, a template type (or template definition) refers to the specification of a set of assertions and constraints that should be monitored by the system. A template instance of solution (or template instance) refers to a set of events that collectively satisfy a template. This is also called a solution to the template. For example, one event can participate in multiple solutions. Each solution will satisfy all constraints in the template. It may not satisfy all multiplicity requirements in which case the actions from those assertions will not be implied. An assertion refers to a part of a template definition indicating some sets of data that if true validate the hypothesis represented by a template definition. Most commonly this will be reference to an event type indicating that events of that type can potentially satisfy the assertion if all constraints are met. An outcome (or action) refers to an action to be initiated by the system when the assertions the action depends upon are all true. This may be an action to publish an event. A group refers to a set of assertions that are collectively satisfied for the group to be satisfied. A constraint refers to a specification of restrictions on the events considered to be satisfying the assertions to which the constraint applies. For example, a constraint that withdraws and deposits must be from the same account is a constraint on withdrawal and deposit events/assertions. A field refers to a piece of data in an event used as input to a constraint or action. An event type (or event definition) refers to a specification for generation of events from ingested data, or to be published from templates. The specification includes definition of fields to be included in the processed events.

According to some embodiments, input source data that includes event data of one or more events is received. One or more event definitions that match the event data are selected. For each matching event definition, the event definition is inputted into a template to generate a set of events. The template includes a number of assertions and has the event definition as one of the assertions, where each assertion includes a constraint. The constraints of the assertions are progressively processed to produce one or more solutions that are subsets of the set of events. For each constraint and each solution, a set of target events that is viable for the solution is identified, and a new solution is produced based on the solution and the identified set of target events, whereby a set of new solutions is produced.

In one embodiment, for each new solution and each outcome in the template, it is determined whether all of the assertions are satisfied. In response to determining that all of the assertions are satisfied, it is determined whether an equivalent outcome has previously triggered. The outcome is triggered in response to determining that the equivalent outcome has not previously triggered.

In one embodiment, in response to determining that at least one assertion is not satisfied and the equivalent outcome has previously triggered, the outcome is un-triggered.

In one embodiment, to trigger the outcome, event data of the new solution is created, and the event data for the new solution is published.

In one embodiment, to publish the event data of the new solution, basic data for the new solution is generated. For each data mapping entry in the outcome, source event values from source events referenced in the data mapping entry are collected, a computation on the source event values is performed to produce a result, and the result is placed in the new solution. Entity data is extracted from the source events. The entity data is aggregated into an entity map, wherein the entity map identifies each entity referenced in the source events.

In one embodiment, to progressively process the constraints of the assertions, partitioning constraints are ordered such that each partitioning constraint is preceded by a constraint targeting a source event of the partitioning constraint. Event subsets are generated for the partitioning constraints in sequence. Remaining non-partitioning constraints are processed.

In another embodiment, to progressively process the constraints of the assertions, non-partitioning constraints are grouped into stages. The stages are ordered to form a hierarchical data structure. Each event is placed into one of a number of partial solutions in each of the assertions having an event definition of the event, where the partial solutions are included in the hierarchical data structure. The partial solutions are separated based on a partition key. Partial solutions having a common partition key are combined to form one or more complete solutions. The combined partial solutions are processed for outcome.

According to some embodiments, systems and methods for processing events are provided. Event data comprising passive event data, active event data, or both is received. It is determined whether the received event data is available for a pattern of passive event data and active event data. In response to determining that the received event data is available for the pattern of passive event data and active event data, one or more constraints between the passive event data and the active event data are converted into one or more query terms. The query terms are used to construct at least one query. Remaining passive event data that is related to some, but not all, of the active event data is obtained using the constructed at least one query. One or more event definitions that match the event data and the remaining passive event data are selected. For each matching event definition, the event definition is inputted into a template to generate a set of events. The template includes a number of assertions and has the event definition as one of the assertions, where each assertion includes a constraint. The constraints of the assertions are progressively processed to produce one or more solutions that are subsets of the set of events. For each constraint and each solution, a set of target events that is viable for the solution is identified, and a new solution is produced based on the solution and the identified set of target events, whereby a set of new solutions is produced.

Figure 1B:
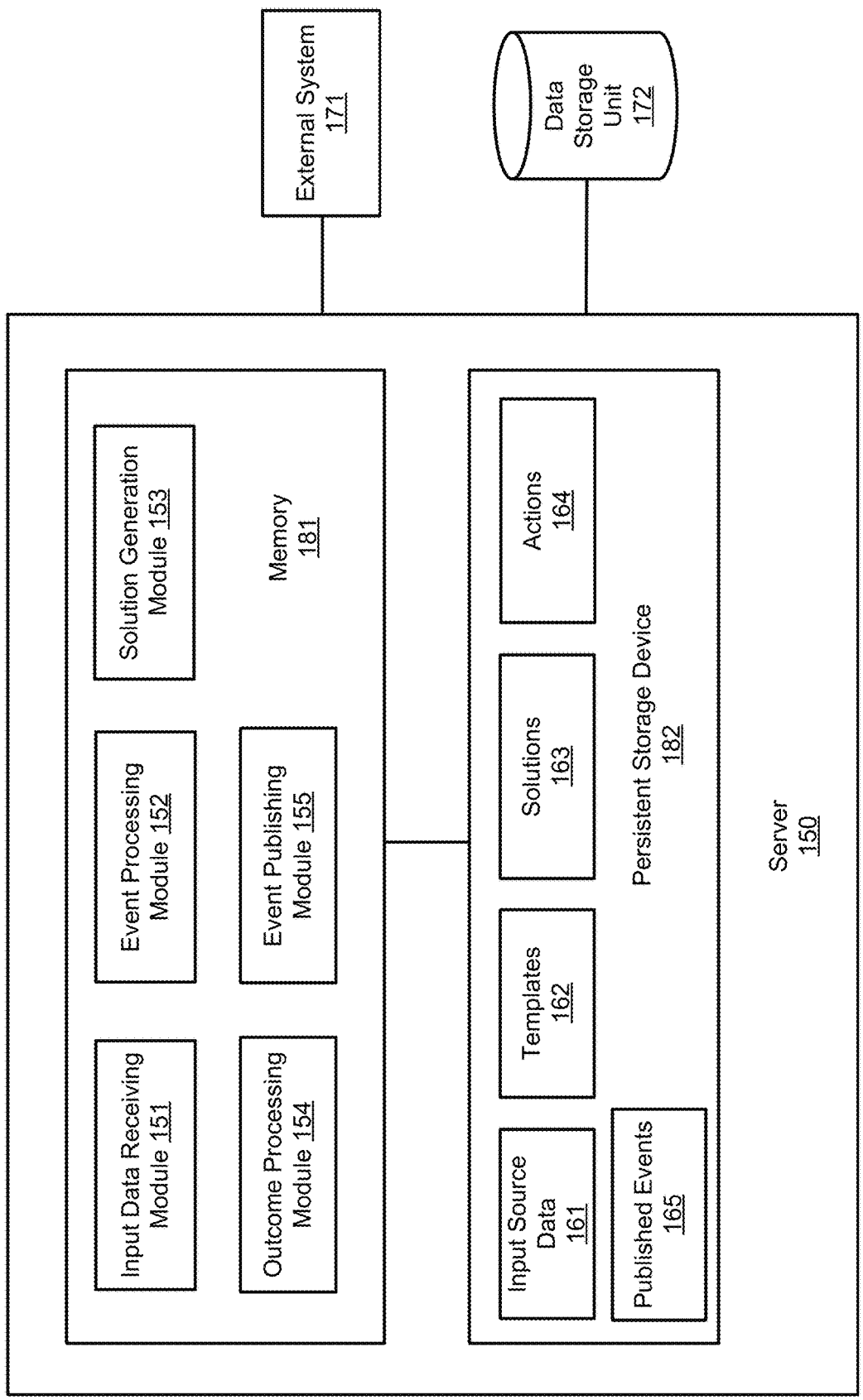

FIGS. 1A and 1B are block diagrams illustrating an event processing system according to one embodiment. In FIGS. 1A and 1B, event processing system 100 may be a hierarchical complex event processing (H-CEP) system. The term "hierarchical" in H-CEP refers to the ability to produce events from one part of the system for input into another part of the system forming a conceptual hierarchy of processing. While the term hierarchy is used, it is possible to form any graph of information flow. As used herein, the term "template" is used to represent a unit of detection for a set of events and relationships between them. The relationships between events are expressed as "constraints" and template matching is performed using a "constraint solver" approach. In some embodiments, the constraint solver is filtering the set of possible event matches rather than computing a "solution" to a numeric problem.

Referring to FIG. 1A, system 100 includes, but is not limited to, one or more user devices 101-102 communicatively coupled to server 150 over network 103. User devices 101-102 may be any type of devices such as a host or server, a personal computer (e.g., desktops, laptops, and tablets), a "thin" client, a personal digital assistant (PDA), a Web enabled appliance, a mobile phone (e.g., Smartphone), a wearable device (e.g., Smartwatch), etc. Network 303 may be any type of networks such as a local area network (LAN), a wide area network (WAN) such as the Internet, a fiber network, a storage network, or a combination thereof, wired or wireless.

User devices 101-102 may provide an electronic display along with an input/output capability. Alternatively, a separate electronic display and input/output device, e.g., keyboard, can be utilized in direct electronic communication with server 150. Any of a wide variety of electronic displays and input/output devices may be utilized with system 100. In one embodiment, a user may utilize user devices 101-102 to access a web-page hosted by the server 150 through the network 103. Server 150 may provide a webpage the user can access by using a conventional web browser or viewer, e.g., Safari, Internet Explorer, and so forth, that can be installed on user devices 101-102. Published events 165 (as described in more detail herein below) may be presented to the user through the webpage. In another embodiment, server 150 may provide a computer application that can be downloaded to user devices 101-102. For example, the user can access a web-page hosted by server 150 to download the computer application. The computer application can be installed on user devices 101-102, which provides the interface for the user to view the published events.

With continued reference to FIG. 1A, server 150 is communicatively coupled or connected to external system 171 and data storage unit 172, which may be over a network similar to network 103. Server 150 may be any kind of server or a cluster of servers, such as Web or cloud servers, application servers, backend servers, or a combination thereof. As described in more detail herein below, server 150 may rely on one or more external sources of input events and produce one or more sets of output (also events). In one embodiment, the sets of output can act as an input to server 150 itself. In some embodiments, server 150 selects events of interest, compares them to defined templates, filters them for combinations of events that match template specific constraints, and potentially publishes new events for matching templates, which can in turn be matched by templates. The results can be used to detect patterns of behavior represented by the matched events, generate alerts for combinations of events of interest, and synthesize summary information from low level pieces of data.

External system 171 can be any computer system with computational and network-connectivity capabilities to interface with server 150. In one embodiment, external system 171 may include multiple computer systems. That is, external system 171 may be a cluster of machines sharing the computation and source data storage workload. In one embodiment, data storage unit 172 may be any memory storage medium, computer memory, database, or database server suitable to store electronic data. Data storage unit 172 may be a separate computer independent from server 150. Data storage unit 172 may also be a relational data storage unit. In one embodiment, data storage unit 172 may reside on external system 171, or alternatively, can be configured to reside separately on one or more locations.

Referring to FIG. 1B, server 150 includes, but not limited to, input data receiving module 151, event processing module 152, solution generation module 153, outcome processing module 154 and event publishing module 155. Some or all of modules 151-155 may be implemented in software, hardware, or a combination thereof. For example, these modules may be installed on persistent storage device 182 (e.g., hard disk, solid state drive), loaded into memory 181, and executed by one or more processors (not shown) of server 150. Note that some or all of these modules may be communicatively coupled to or integrated with some or all modules of server 150. Some of modules 151-155 may be integrated together as an integrated module.

In one embodiment, input data receiving module 151 may receive source data from external system 171 or data storage unit 172. For example, the source data may be pushed where the data is provided directly to server 150 when available (i.e., direct feed). Alternatively, the source data may be pulled where server 150 (i.e., module 151) requests the source data periodically from external system, for example through a database query such as Solr, structured query language (SQL), etc. The source data may include input events, and may take any form of structured data and unstructured data (e.g., non-uniform content). Any data such as Extensible Markup Language (XML), Comma-Separated Values (CSV), Java Script Notation (JSON), and Resource Description Framework (RDF) data can be used as structured data. In one embodiment, the source data may be source data that can be mapped with a lexicon (or filtered using lexicon data) from outside sources as described in U.S. Pat. No. 9,858,260, entitled "System and method for analyzing items using lexicon analysis and filtering process", the disclosure of which is incorporated herein by reference. Upon receiving the source data, module 151 may store the source data as input source data 161 on persistent storage device 182.

In various embodiments, when performing event processing an important component is obtaining input events from external sources or systems. For example, obtaining correct events in a timely manner can be critical. Accordingly, in an embodiment, streaming/active (or push) data sources can be combined with passive (or pull) data sources to improve the accuracy of the events obtained and the timeliness of the events obtained from passive data stores (e.g., structured query language (SQL) databases, web services, etc.).

In an embodiment, a source of active data may be leveraged to initiate obtaining data from passive sources. Given a pattern of assertions and constraints, where an assertion may relate to a source event and represent a set of events that satisfy constraints between that assertion and others, collectively to match the pattern as a whole, it can be defined as to how to process a pattern with a mix of active and passive data sources and obtain from the passive data sources a targeted set of events in a timely manner.

In an embodiment, a pattern of all passive data can be processed using periodic queries to obtain events (e.g., polling) from one or more sources to trigger updates and simulate the effects of having an active data source. Once a source of events (active or polled) is available for a pattern, the remaining passive data sources can be queried for related events. In an embodiment, constraints between the active data and the passive data (e.g., common constraints in the active and passive data) are converted into a query term (e.g., all constraints between the two assertions are converted into a single query). This query term utilizes the values in each of the available events (e.g., actively or passively obtained in a preceding query) to construct a targeted query on the passive data source represented by the assertion being processed. If there are multiple available events from multiple assertions, the query term utilizes them with appropriate constraints to generate an optimal query. For example, if an active event contains a time value and the passive events are constrained to be +/−5 minutes from an active event time value, a query can be constructed to identify the events in the passive data source that are within that time window. When the number of events is limited in the passive event set the query is constructed to obtain the events closest to a targeted value (time, for example). This may require that two queries be performed to obtain values above/below the target value. Once a set of events for a passive assertion have been obtained they are streamed into the pattern as if they were active, and this may trigger more constraint processing, possibly including more passive data sources.

Input source data 161 that includes a number of events may be fed to event processing module 152 for each defined template in templates 162. In one embodiment, templates 162 may be predefined and stored on persistent storage device 182 for subsequent usage. Templates 162 may be defined using a visual notation, and stored in machine readable format definition (e.g., JSON, XML, binary, etc.) used in processing the templates. Each template is represented by event processing module 152 that receives all events that are of event types that appear in the template. For each template, module 152 may sift the events (as assertions) looking for all possible matches with the events from input source data 161 given defined constraints.

For each set of matching events, event publishing module 155 may publish one or more new events and store them as published events 165 on storage device 182. When an event is published, the template definition can define data from the source events to be included in the published event(s). In addition, to explicit data copying, some aspects of the source events are automatically copied to allow traceability of the published event and for system-wide concerns (such as entity tracking). In one embodiment, published events 165 may serve as input events to server 150.

Solution generation module 153 may produce a set of viable solutions 163 (stored on storage device 182) for a template (e.g., any of templates 162). To produce solutions 163, module 153 may start with all events, and then progressively process constraints to produce solutions that are subsets of the original set of events. For each constraint, each solution produced by a prior constraint is augmented with matching events for that constraint. This process performs a breadth first traversal (or search) of all possible solutions by progressively pruning the events in any one solution and producing new solutions where there are alternate viable solutions. For each type of constraint, the production of target events that are viable for the input solution is constraint specific logic. Once a set of target events is identified a new solution is produced from the input solution and the identified target events. Multiple solutions can be produced from one input solution when multiple sets of targets are identified. Once all constraints have been processed the new set of solutions is complete. Each such solution is also referred to as a "template instance" meaning an instance that matches that template type.

Once a template instance with matching events is determined by module 153, it is evaluated for actions, such as actions 164, to take by outcome processing module 154. The actions 164 may be predetermined and stored on storage device 182. If the multiplicity of all assertions is met for input to an action, module 154 may trigger that action. A triggered action can access the input events that initiated the action. In the case where a previously triggered action is not triggered after the solution being updated it is un-triggered. Thus, if a solution matches the set of multiplicities and a new event arrives, that means it no longer does so, the previously triggered action is un-triggered. In the case of a published event that event is retracted when un-triggered. This causes the event to be removed from all solutions that may include it and those template instances re-evaluated.

Figure 2:
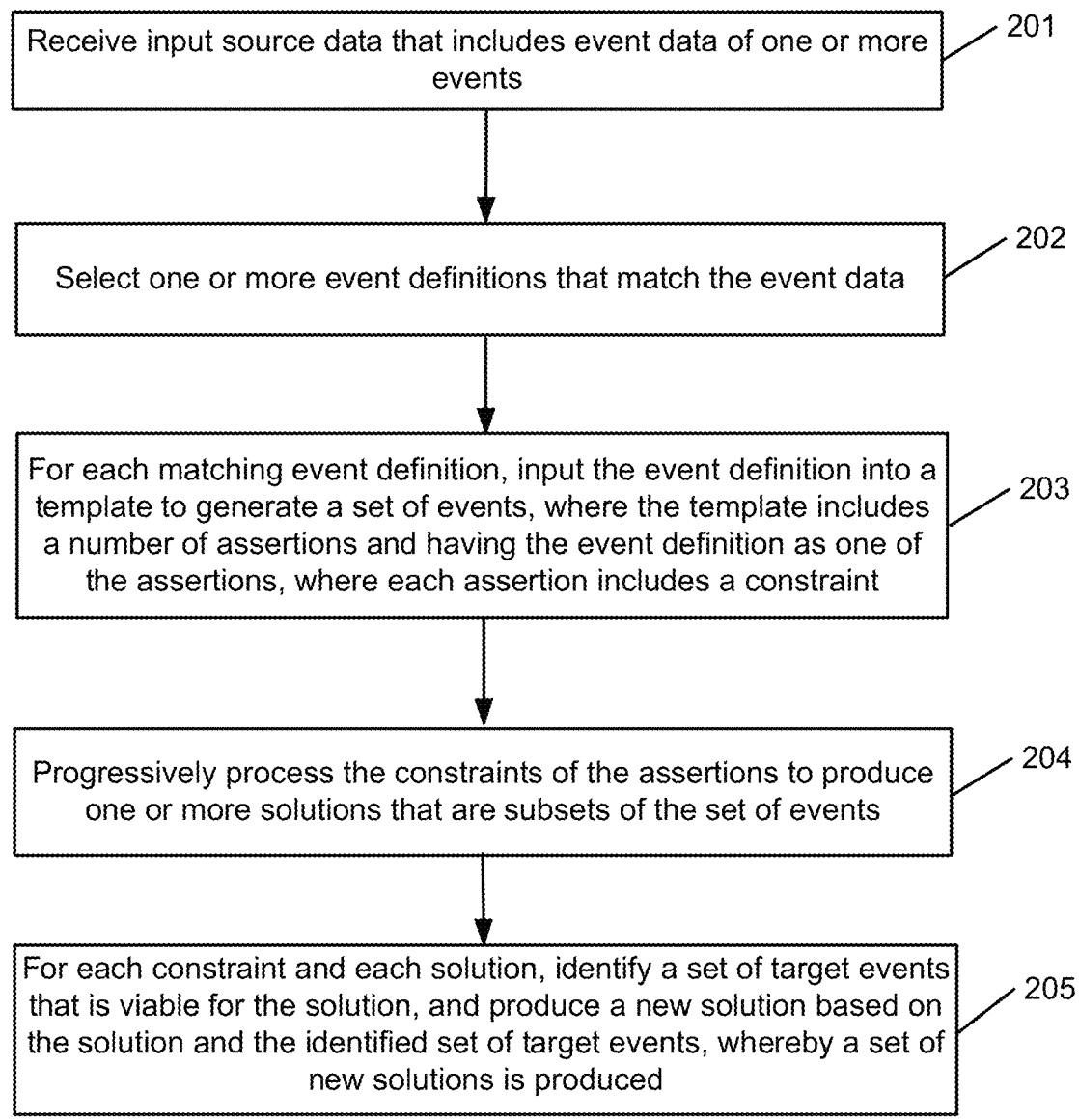
FIG. 2 is a flow diagram illustrating a method of processing an event according to one embodiment.

FIG. 2 is a flow diagram illustrating a method of processing an event according to one embodiment. Process 200 may be performed by processing logic which may include software, hardware, or a combination thereof. For example, process 200 may be performed by server 150, e.g., some or all of modules 151-155.

Referring to FIG. 2, in operation 201, the processing logic receives input source data that includes event data of one or more events. In operation 202, the processing logic selects one or more event definitions that match the event data. In operation 203, for each matching event definition the processing logic inputs the event definition into a template to generate a set of events. The template includes a number of assertions and has the event definition as one of the assertions, where each assertion includes a constraint. In operation 204, the processing logic progressively processes the constraints of the assertions to produce one or more solutions that are subsets of the set of events. In operation 205, for each constraint and each solution, the processing logic identifies a set of target events that is viable for the solution, and produces a new solution based on the solution and the identified set of target events, whereby a set of new solutions is produced.

Figure 3:
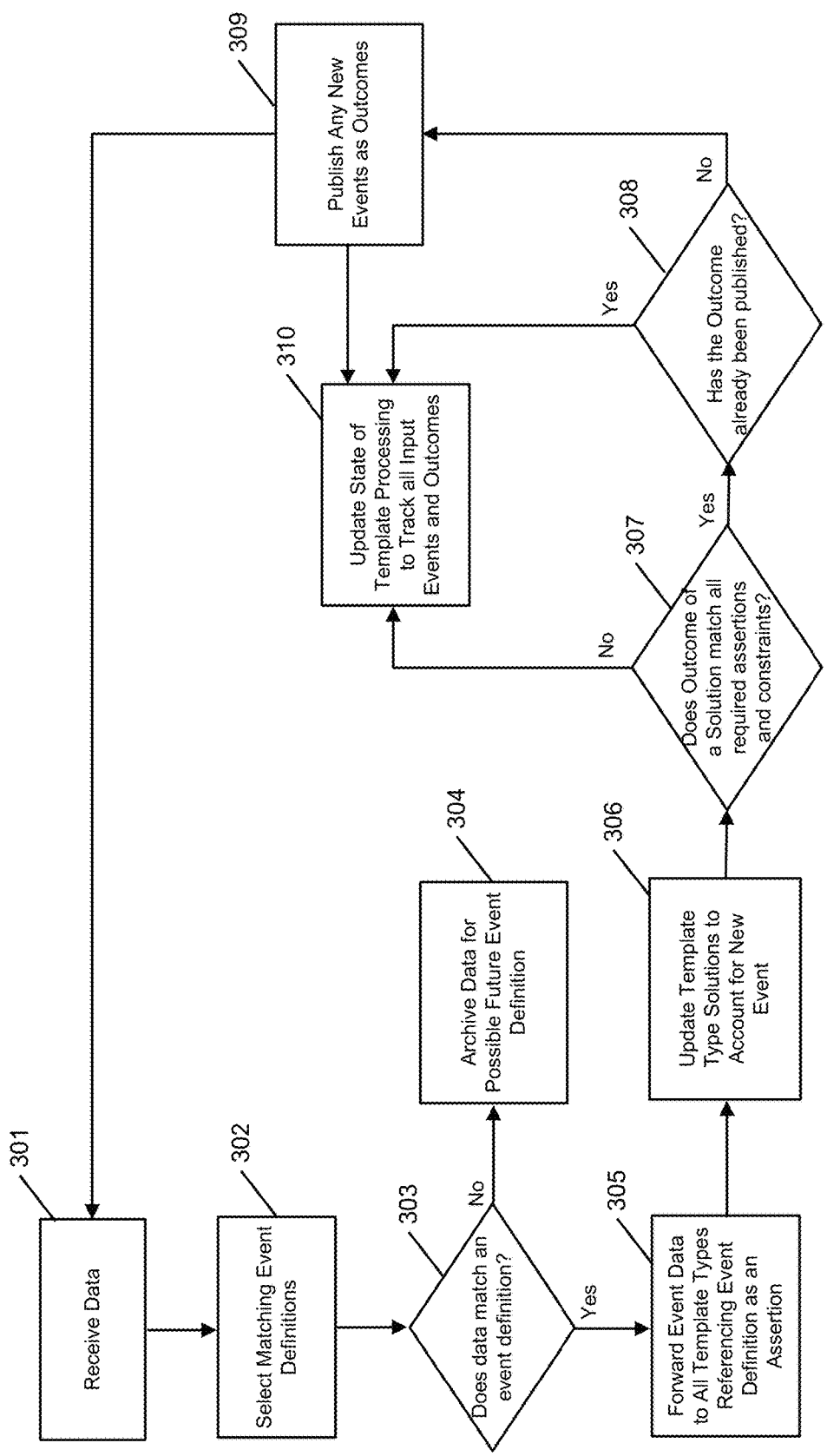
FIG. 3 is a flow diagram illustrating a method of processing an event according to another embodiment.

FIG. 3 is a flow diagram illustrating a method of processing an event according to another embodiment. Process 300 may be performed by processing logic which may include software, hardware, or a combination thereof. For example, process 300 may be performed by server 150, e.g., some or all of modules 151-155.

Referring to FIG. 3, in operation 301, the processing logic receives input source data (which includes an event), for example directly from external system 171 or by polling for new data from external system 171. As previously described, external system 171 may be a cluster of machines that collectively provides the input source data. Once the input source data is received, in operation 302, the processing logic matches the input source data against event definitions which determine the role the data represents in the patterns to be matched. In operation 303, the processing logic determines whether the input source data matches an event definition. One piece of data can match multiple event definitions and thus forwarded to multiple template type processing elements. If no event definition matches the data, in operation 304, the data can be archived for possible match against event definitions created in the future, or discarded based on overall requirements. Otherwise, in operation 305, for each event type the processing logic forwards the data to the relevant template type processing elements (1103) that have that event type as an assertion in their template definition. Upon receipt of events in the template type, in operation 306, the processing logic updates the set of solutions for the known events. This update can occur immediately, after a delay, or upon receipt of sufficient number of new events based on latency and throughput requirements. A solution is a subset of all events sent to the template processing element (also referred to as module, unit, or logic) that collectively match assertions of the template definition and satisfy all constraints between those assertions. The number of required events in the assertion is a secondary condition on whether the solution "matches" and does not limit the events being considered in the solution. The template processing element for each template type produces an updated set of all solutions given the known events. Treating each solution separately, in operation 307, the processing logic examines to determine if all assertions that are input to an outcome have been satisfied. If satisfied and the outcome has not published an equivalent event (in operation 308), in operation 309, the processing logic publishes that event as an outcome. Otherwise, the processing logic proceeds to operation 310. In one embodiment, publishing an event involves looking at the outcome definition to determine which data elements from the source events should be copied to the published event, and adding system determined data to the published event, and then sending that event to any external system (e.g., system 171) requesting such, and/or sending the event to server 150 itself as a newly received event (in operation 301). Following operation 309, any affected template processing elements persist, in operation 310, the processing logic updates their state to record or track all received and published events. It should be noted that the state for each solution may be tracked and persisted independently of other solutions, that state updates may occur continuously during the computation process or at the end, and that state updates may occur while processing one event or a small number of events to meet throughput or latency requirements.

Template Notation

The following sections define the notation used and the options available to define templates in a system (e.g., system 100). FIGS. 4A-4G are diagrams illustrating template notations according to one embodiment.

Source Events/Assertions

Figure 4A:
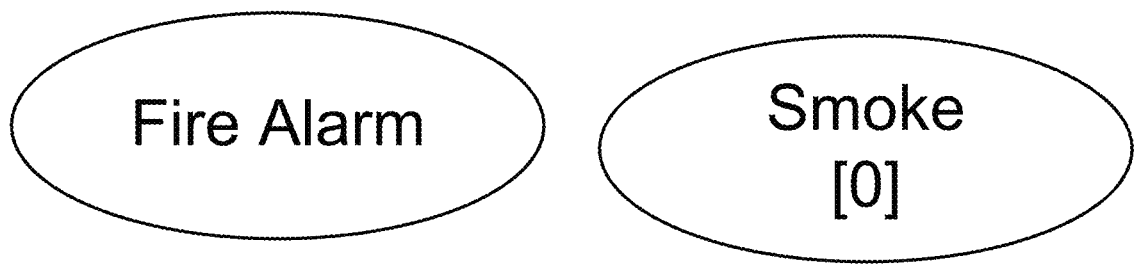
FIGS. 4A-4G are diagrams illustrating template notations according to one embodiment.

Referring to FIG. 4A, events called assertions appear on a template, for example as an oval, with a label indicating the event type (e.g., fire alarm, smoke). Other types of assertions such as constant values or configuration values are supported. Events are extracted from input data provided to the system as defined in the system description. If an event definition is modified the set of extracted events is updated from archived raw data. Such a change can both publish new events for new matches, or remove events for prior matches that no longer match the modified definition.

Source events can have a multiplicity specification, which indicates the minimum and maximum number of such events are to be matched to one template instance (one set of conforming/matching events). For example, a template looking for money transfers would look for one withdraw followed by a deposit, while a different template may look for at least 3 people from a specific group who book travel to the same city.

Published Events/Outcome/Action

Figure 4B:
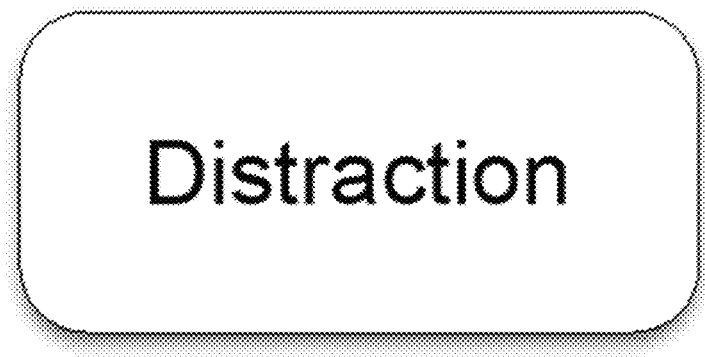

Referring to FIG. 4B, aspects of the disclosure include the publishing of events to represent a condition hypothesized by a template. A published event may be a type of action or outcome of a template and represented, for example by a rounded corner rectangle with a text name label as shown herein below, and is connected to each source event or group. Other outcomes may include alerts or invocation of specific programming logic. Each source event is connected to the outcome, for example by a line. In one embodiment, each outcome to publish an event may include a map defining data mapping from the source events to the published event. In one embodiment, a time range of all source events is automatically recorded in the published event, as is the source template instance. For example, when each event has a time recorded, the system may record in the published event minimum and/or maximum times of all input events. The template author can indicate that select fields from the source events are to be propagated to the published event. The event is published as soon as an event is matched to each connected source event, even if there are more source events on the template. As such, this allows a partial match of a template to still publish events when warranted. For example, a template may wish to publish an event when a critical phase of a process has been detected even if there are further steps in the process that could be detected. These partial matches can be used to drive visualizations, risk management, and/or alerting.

Temporal

Figures 4C, 4D:
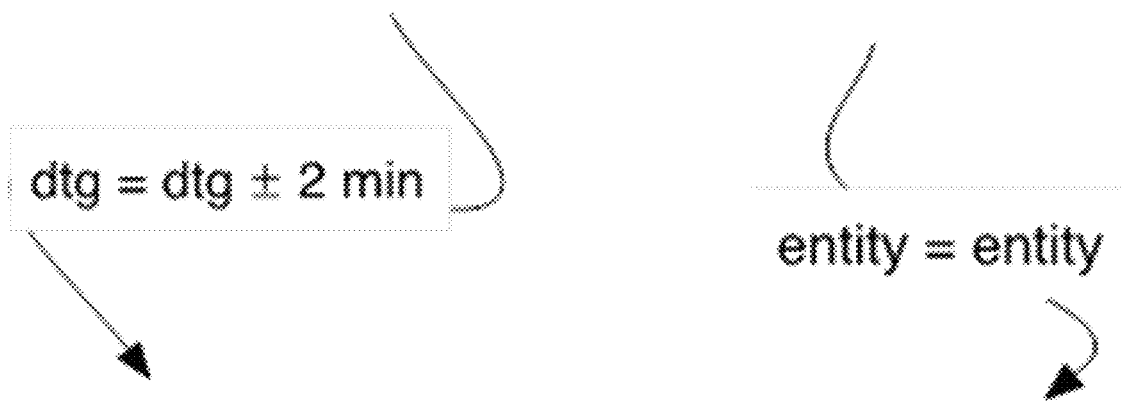

Referring to FIG. 4C, in some embodiments, a primary constraint in templates is control of event time relationships. Temporal constraints allow an author to easily indicate that one event should follow another event within a time period, or to be within a certain tolerance of each other within a time period. Such constraints may apply to the time of the real world event, not to the time the data is processed or recorded by the system. Temporal constraints can include fuzzy match parameters such as A must follow B by 15 to 20 minutes, or A must follow B by 10+/−2 minutes. In addition to a time range, temporal constraints can require the difference in time be greater or less than a specified duration (less than 4 min, or at least 5 min, etc.). Temporal constraints, for example, may be represented as a directed arrow with any time constraints as a textual label over the line. Events can have more than one temporal value (such as air ticket booking time, departure time, and arrival time), in which case the temporal field name will be shown in the constraint text as in "arrival<departure" or "booking+24 h<departure".

Relational

Referring to FIG. 4D, relational constraints may indicate, for example, that two events must have values of a specific relationship between two fields. Data fields come from the originating data item that matched an event definition. This constraint is useful for ensuring transactions apply to the same account, originate or reference the same entity (=), have amounts greater than (>), less than (<), greater than or equal (>=), less than or equal (<=), and so on. Relational constraints, for example, may be represented by a line with an arrow, the field names, and a relational operator such as "name=name" and are read in the direction of the arrow with the first field name from the source of the arrow and the second field name from the head of the arrow (as shown herein below). Relational constraints can operate on strings, numbers, temporal data, unique IDs, and geographic data, with both fields of compatible types.

Aggregation

Figure 4E:
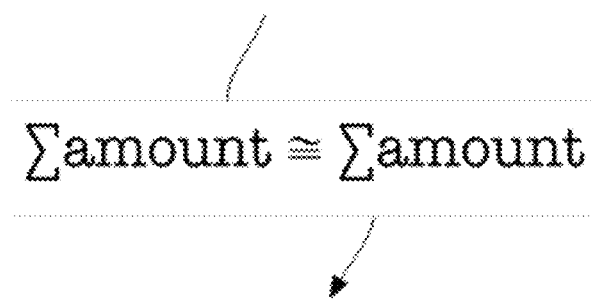

An aggregation constraint performs a calculation on a set of source events and compares that to a threshold. The threshold can be a constant or a calculation from another set of source events or the same set of source events. Examples include looking for an aggregate transfer of money over $10,000 in a 30-day period, or looking for an aggregated amount of fertilizer of 200 lbs sold to the same buyer, or buyers associated with the same organization or cell. An aggregation constraint, for example, may be represented as a line with a symbol indicating a primary computation (e.g., sum, average, minimum, maximum), and either the threshold or a second computation (as shown in FIG. 4E).

Partition

Figure 4F:
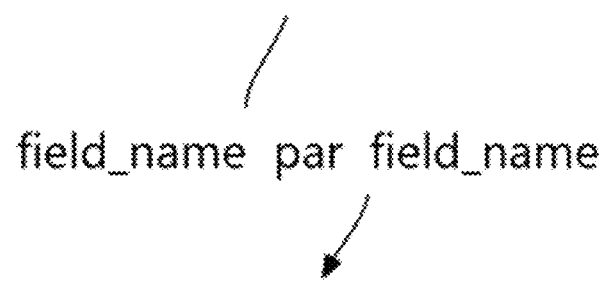

A partition constraint separates the set of potentially matching events into subsets based on a field value. In one embodiment, the field value may be an identifier for people, places, or things. In another embodiment, the field value may be a quantity value such as a dollar amount or other measure being compared. This is used to ensure that events with different field values are not combined in the same template solution. For example when considering if travel to a restricted country matches the restrictions a partition constraint will be used to ensure that each solution considers only one person's travel. Partition constraints are generally from one assertion to the same assertion indicating they apply to one set of events, and may be represented, for example, as a line with field name and "par" as the operator as in "field_name par field_name" to indicate that all such events must have the same name to be considered in the same template instance (solution), as shown in FIG. 4F.

Logical Combination

Figure 4G:
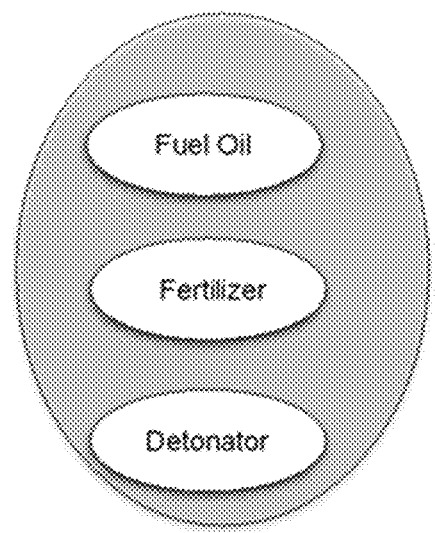

In order to support more complex situations, the use of groups to combine conditions (source events) can be used. All events enclosed within a group must be met for that group to be met. If an action has multiple inputs, then any of those inputs can trigger the action. Thus, each group acts like an "and" condition, while multiple input lines act as an "or" condition. Groups are represented, for example, as an ellipse enclosing the source events (e.g., fuel oil, fertilizer, detonator, etc.), as shown in FIG. 4G.

Template Examples

Figure 5A:
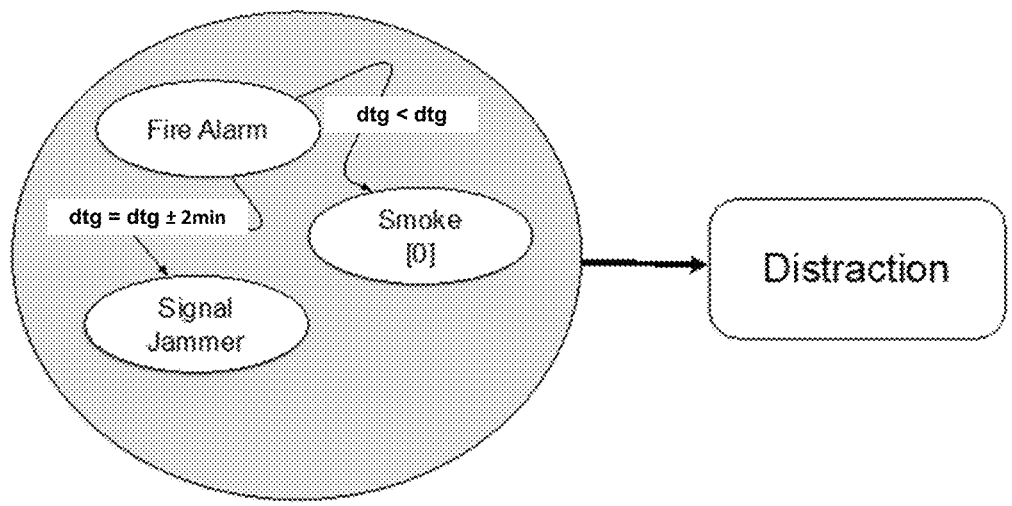
FIGS. 5A-5D are diagrams illustrating template examples according to one embodiment.
Figure 5B:
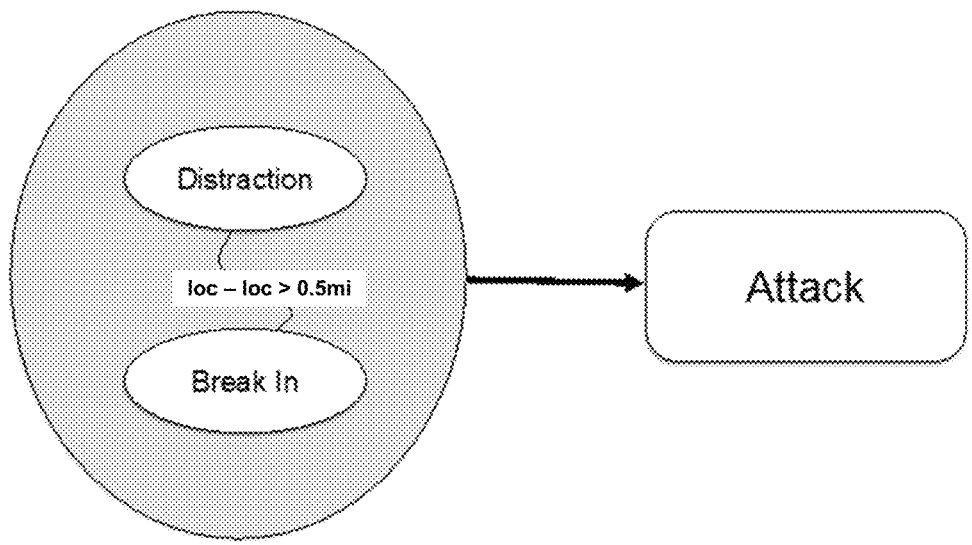
Figure 5C:
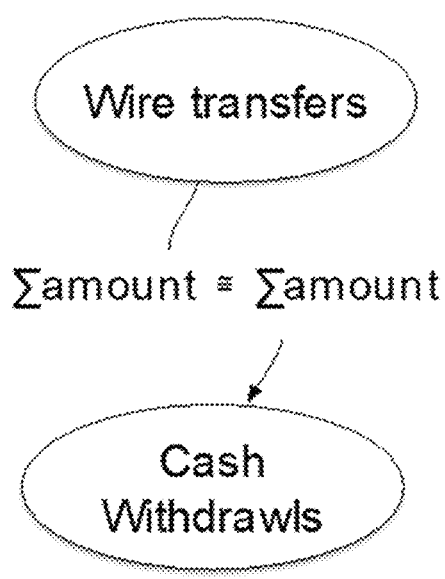
Figure 5D:
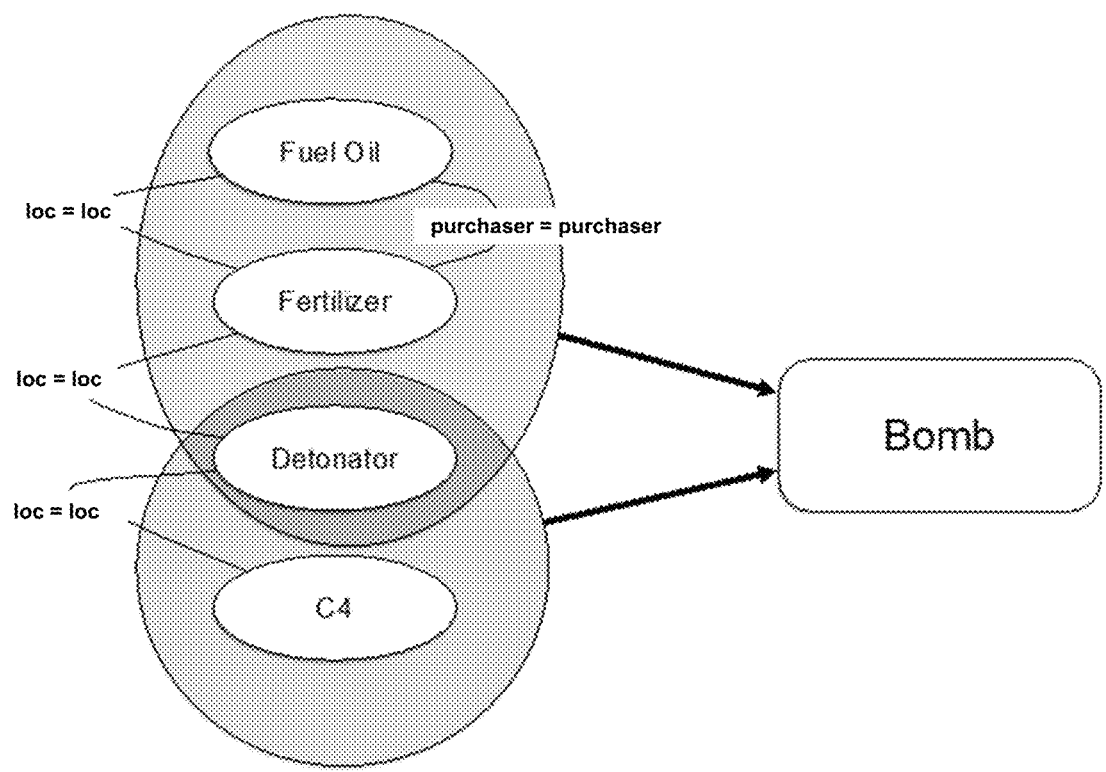

FIGS. 5A-5D are diagrams illustrating template examples according to one embodiment. The sample templates are provided to show the notation in context. For example, in FIG. 5A, the sample template (e.g., Template 1) may be defined to detect a distraction tactic. In FIG. 5B, the sample template (e.g., Template 2) may be an attack strategy using distraction published event and custom constraint. In FIG. 5C, the sample template (e.g., Template 3) may be an aggregation between two sets of correlated events. In FIG. 5D, the sample template (e.g., Template 4) may be the use of And/Or for more complex conditions.

Representation

FIGS. 6A and 6B illustrate a representation of a template in JavaScript Object Notation (JSON) according to one embodiment. FIGS. 6A and 6B document the representation of one of the prior examples as JSON as one persistent representation of the notation. The notation may be represented as XML, or RDF as well.

Template Matching/Constraint Solving/Solution Filtering

Aspects of the disclosure include template matching. For example, given a set E of events that meet one of the assertions of a template definition, and given C the set of all constraints on those assertions, the template matching component produces all subsets of E that satisfy the set of constraints C for which there are events in the target assertion of each of C. Note that in cases where an assertion is optional, events may or may not be present, and if not present, the corresponding constraints do not need to be met for a valid solution. Thus, solutions can have a subset of all defined assertions and still be considered a solution if they satisfy all constraints that have any of those assertions as a target. Each such solution results in a template instance in the system. Each instance is persisted and tracked as new events are received, and may be deleted if no longer applicable to the set of known events (most common when critical events are retracted as described in more detail herein below).

In one embodiment, a method of producing subsets of E is as follows:

1) Order the partition constraints such that each constraint is preceded by any that has constraints targeting the source of the partition constraint and source from the partition constraint. In other words, treating all constraints (source→target) as a directed graph order partition constraints based on that directional ordering.

2) Generate event subsets for partition constraints in sequence:

a. For the source events of the partition constraint separate the events into sets with the same value for the field referenced by the constraint.

b. Process all non-partition constraints originating from the target of the partition constraint in sequence until they encounter a partition constraint.

3) Process all remaining unprocessed non-partition constraints.

A constraint is processed by receiving as input all event subsets detected by prior constraints, and producing subsets of those subsets that also meet the constraint in question. Thus, as an example, if a constraint is presented 3 subsets and it detects that subsets 1 and 3 satisfy the constraint but subset 2 must be partitioned into 2 subsets to satisfy the constraint it will produce 4 subsets as input to the next constraint. This process can be likened to a breadth-first search, but given that all solutions are produced, it is not a search in the typical sense of looking for a single solution. In this case all viable solutions are identified.

Figure 7:
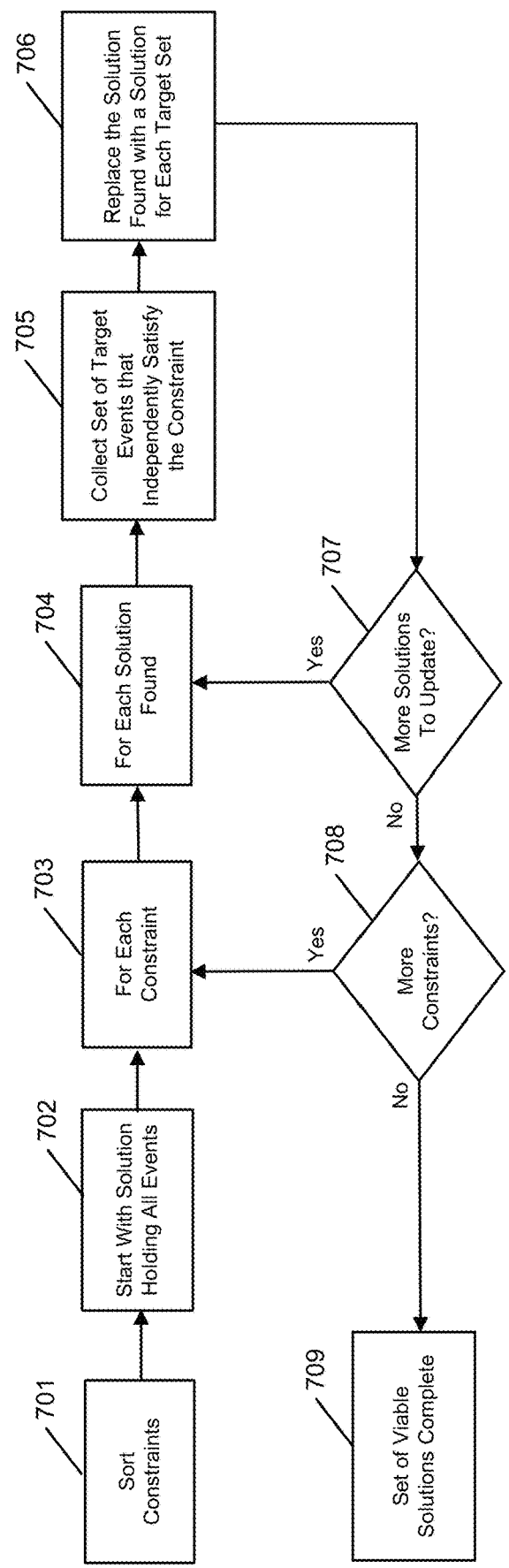
FIG. 7 is a flow diagram illustrating a method to generate solutions according to one embodiment.

FIG. 7 is a flow diagram illustrating a method to generate solutions according to one embodiment. Process 700 may be performed by processing logic which may include software, hardware, or a combination thereof. For example, process 700 may be performed by server 150, e.g., solution generation module 153.

Referring to FIG. 7, at operation 701, the processing logic sorts the constraints. As previously described, partition constraints may be ordered such that each constraint is preceded by any that has constraints targeting the source of the partition constraint and source from the partition constraint. In other words, treating all constraints (source→target) as a directed graph order partition constraints based on that directional ordering. At operation 702, the processing logic starts with a solution with all events, then progressively processing constraints to produce solutions that are subsets of the original set of events. That is, at operations 703-705, for each constraint the processing logic augments each solution produced by a prior constraint with matching events for that constraint. That is, the processing logic collects a set of target events that independently satisfy the constraint. This process performs a breadth first traversal (or search) of all possible solutions by progressively pruning the events in any one solution and producing new solutions where there are alternate viable solutions. For each type of constraint, the production of target events that are viable for the input solution is constraint specific logic. Once a set of target events is identified, a new solution is produced from the input solution and the identified target events. Accordingly, in operation 706, the processing logic replaces the input solution with the new solution for each set of target events. In one embodiment, multiple solutions can be produced from one input solution when multiple sets of target events are identified. Once all constraints have been processed, the new set of solutions is complete. Each such solution is also referred to as a "template Instance" meaning an instance that matches that template type. In operation 707, the processing logic determines whether there are more solutions to update. If so, the processing logic proceeds to operation 704. Otherwise, the processing logic proceeds to operation 708 where the processing logic determines whether there are more constraints. If so, the processing logic proceeds to block 703. Otherwise, the processing logic proceeds to operation 709 where a set of viable solutions (e.g., solutions 163 of FIG. 1B) is produced for a template.

In another embodiment, a method of producing subsets of E is as follows:

1) Group non-partitioning constraints by the assertions they relate to such that an equality constraint is first and other constraints between the same assertions follow. Call each a stage.

2) Order stages such that they form a hierarchical data structure, e.g., a tree with leaves as the raw input events and culminate in a single stage. This ensures the raw events are input to only one stage and only processed results are input to any other stage using either input assertion. Stage identification and constraint ordering may occur at the time the template is instantiated for processing, as events are received, or pre-processed and delivered with the template definition.

3) Each assertion in each stage is processed in order receiving each event from each input and producing all valid pairs of events that satisfy the constraint. For constraints that follow another constraint in a stage it receives the set of processed pairs and filters those pairs to those valid for the constraint as well.

4) This results in a stream of partial solutions having one event for each assertion constrained in the template.

5) The set of partitioning constraints are used to form a partition key for each partial solution.

6) In cases where an assertion has minimum multiplicity >1 all partial solutions for the same partition key are merged to form a complete solution and this is compared to the multiplicity restrictions on all assertions and either accepted or rejected as a valid solution. Once a valid solution is found it will drive event publishing as defined in the template.

7) In cases where minimum multiplicity on all assertions is <=1 the combining of partial solutions and event publishing can be combined by incrementally modifying prior published outcomes with any added events upon receipt of new partial solutions with previously unpublished event data.

8) In cases where for any partition key a valid solution is found and an encompassing invalid solution is later found (one that encloses all events in the valid solution) a retraction is published, indicating the prior valid solution is not valid and any solutions dependent on that event are in turn suspect and must be re-evaluated.

9) In cases where a minimum multiplicity is 0 the processing is split into required and optional constraints and any partial solutions from the required constraints are processed both by the optional constraints and directly to combining and publishing. This can result in a retraction if an optional assertion is matched following publishing of an outcome from the required only constraints.

Figure 8:
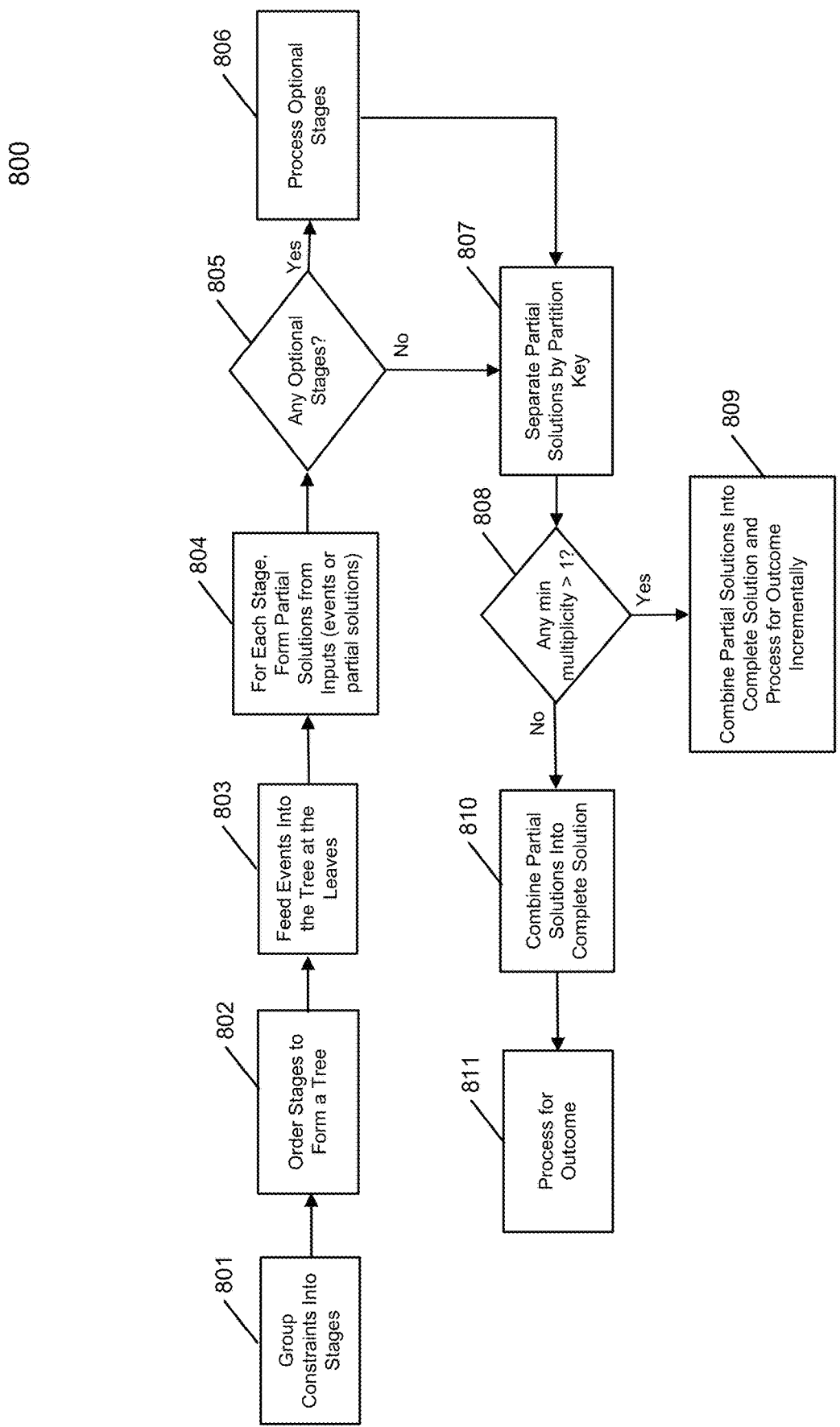
FIG. 8 is a flow diagram illustrating a method to generate solutions according to another embodiment.

In this approach, FIG. 8 is a flow diagram illustrating a method to generate solutions according to another embodiment. Process 800 may be performed by processing logic which may include software, hardware, or a combination thereof. For example, process 800 may be performed by server 150, e.g., solution generation module 153.

In operations 801 and 802, the processing logic processes events continuously as they arrive and fed to the constraint processing pipeline established by the ordering and grouping into stages. In operation 803, the processing logic may place each event received into a partial solution in each of the assertions having that event type. This allows constraints to work with partial solutions as input and output. Each constraint retains for each observed value in the constrained fields a list of matching partial solutions for each of its inputs when it is the first constraint of a stage. This allows it to produce new partial solutions combining both inputs upon receipt of any new input. For example: A constraint constrains assertion A with field identifier (id) to equal assertion B with field person_id. For each value received in A.id and B.person_id, it tracks the partial solutions with that value. When a new partial solution with A arrives with a given value it can be combined with all matching partial solutions with B.person_id having the same value. Once the partial solutions are joined based on equality of some form, the remaining constraints in that same stage only need filter the stream of partial solutions to those that also meet those constraints. Operation 804 reflects this processing by stages and feeding of partial solutions from one constraint to the next within a stage, and from one stage to the next as defined in the template. In operation 804, the processing logic determines whether there are optional stages. If there are optional stages, the stream of partial solutions is split going directly to operation 806 and to operation 807. Optional stages may be processed in a similar fashion to required stages except that the output of each stage is sent to operation 807 as well as the next optional stage. In one embodiment, optional stages are ordered as are required stages such that any new inputs are processed by only one stage and then combined into any partial solutions received from prior stages (operation 806). Following constraint processing partial solutions are partitioned based on the partition key constructed from partitioned fields. The key may be formed from the value within the partial solution of the values for each partitioned field in the template (operation 807). Partial solutions with different partition keys are not combined into the same solution. In operation 808, the processing logic determines whether any min multiplicity is greater than 1. If no assertion has a min multiplicity >1, then the stream of partial solutions can be fed directly to the outcome processing and any combining of results performed incrementally as any new inputs must be additive to the prior result for any specific partition key (operation 809). If such a multiplicity exists in the template, then partial solutions may be combined and held until a valid or invalid solution is found (operation 810). If an invalid solution is found first, then no outcome is triggered for that partition key. If a valid solution is found first for a partition key, then the outcome may be triggered. If an invalid solution is found following a valid one, then the outcome that was triggered is un-triggered (for event publishing this results in a retraction as described in more detail herein below).

Event Publishing and Actions

Once a template instance with matching events is determined (as described above), it is evaluated for actions (e.g., actions 164 of FIG. 1B) to take. If the multiplicity of all assertions is met for input to an action, that action may be triggered. A triggered action can access the input events that initiated the action. In the case where a previously triggered action is not triggered after the solution being updated, it is un-triggered. Thus, if a solution matches the set of multiplicities and a new event arrives that means it no longer does so, the previously triggered action is un-triggered. In the case of a published event that event is retracted when un-triggered. This causes the event to be removed from all solutions that may include it and those template instances re-evaluated.

Figure 9:
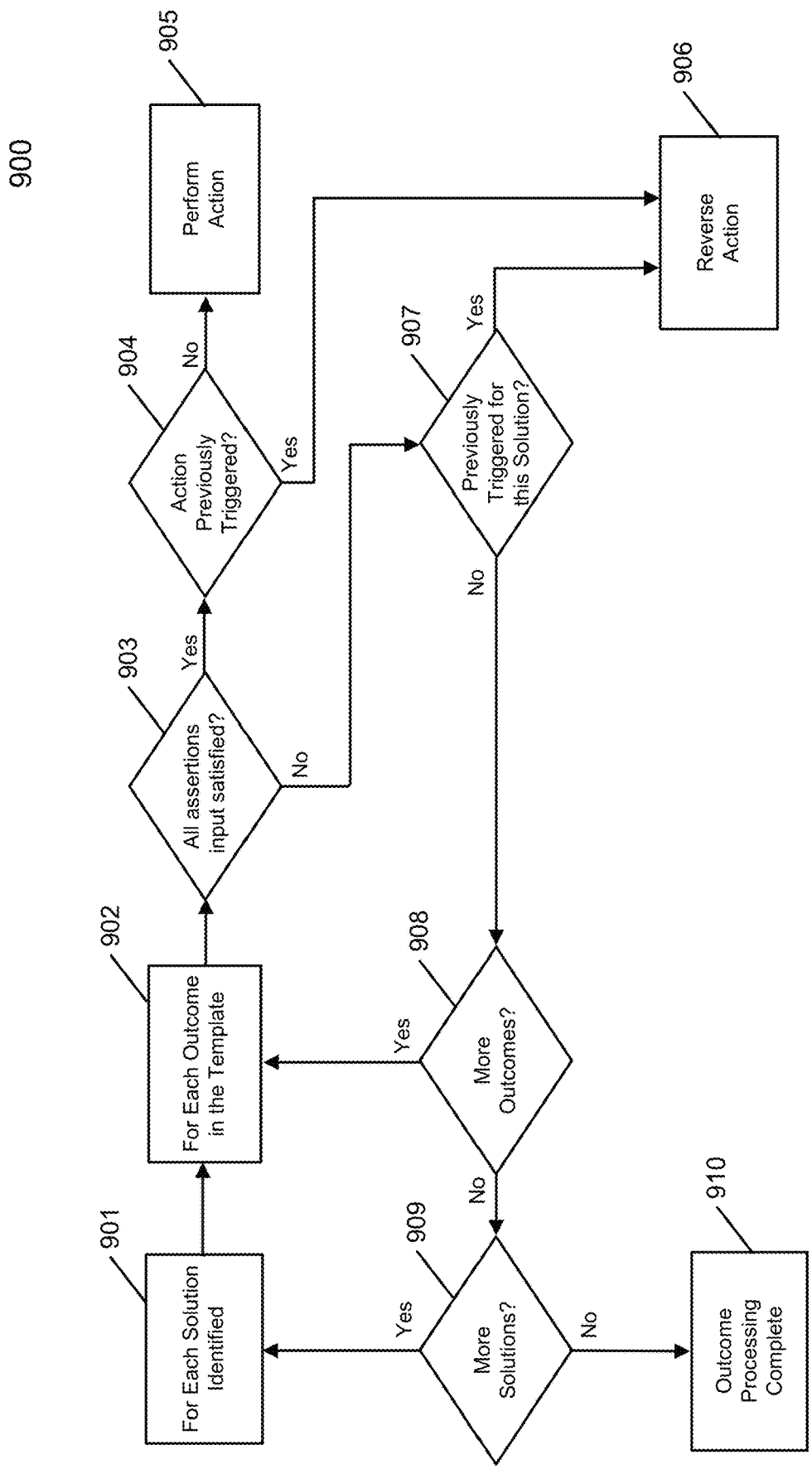
FIG. 9 is a flow diagram illustrating a method to process an outcome or action according to one embodiment.

FIG. 9 is a flow diagram illustrating a method to process an outcome or action according to one embodiment. Process 900 may be performed by processing logic which may include software, hardware, or a combination thereof. For example, process 900 may be performed by server 150, e.g., outcome processing module 154.

Referring to FIG. 9, once the set of solutions are identified, outcome processing is performed. At operations 901-903, for each solution identified and each outcome in the template, the processing logic evaluates the state of the outcome for that solution. That is, in operation 903 the processing logic determines whether all assertions are satisfied. If all assertions are satisfied, in operation 904, the processing logic determines if an equivalent action has previously occurred. If the equivalent action has not previously occurred or triggered, in operation 905, the processing logic triggers the action (e.g., one of actions 164 of FIG. 1B). If the assertions are not satisfied and an action has previously been triggered (operation 907), at operation 906, the processing logic determines that the action is un-triggered and reverses the action.

For the case where the outcome is publishing a new event, triggering consists of creating the event data and publishing it, and un-triggering consists of removing the event data from the system and re-computing the status of affected templates (i.e., reverse action). Either case can cause a ripple effect as templates are update because of the published or retracted event.

When an event is published in this manner, data from the input events (assertions) are moved to the published event as defined by the outcome "data mapping". This data mapping defines what fields of which assertions are to be copied to which fields in the event being published. In addition to this explicit data mapping, there is implied mapping. Implied mapping can add data to the published event (such as required for full text search), or algorithmically copy data from input events (such as entity tracking).

Entity tracking refers to the automated copying of identifying information from source events to published events to track the "entities" involved in the template match. All entities referenced in source events are aggregated into the published event, and would contribute to the entity list for any events published with this event as a source. This hierarchical aggregation of entity data is useful in many scenarios where the invention is used to track behavior of people, organizations, or devices (commonly called "entities"). In addition to simple data replication it is possible to support computation to occur as part of the "data mapping" process where the mapping includes the formula for the computation and references to the assertion and fields as input to the computation.

Figure 10:
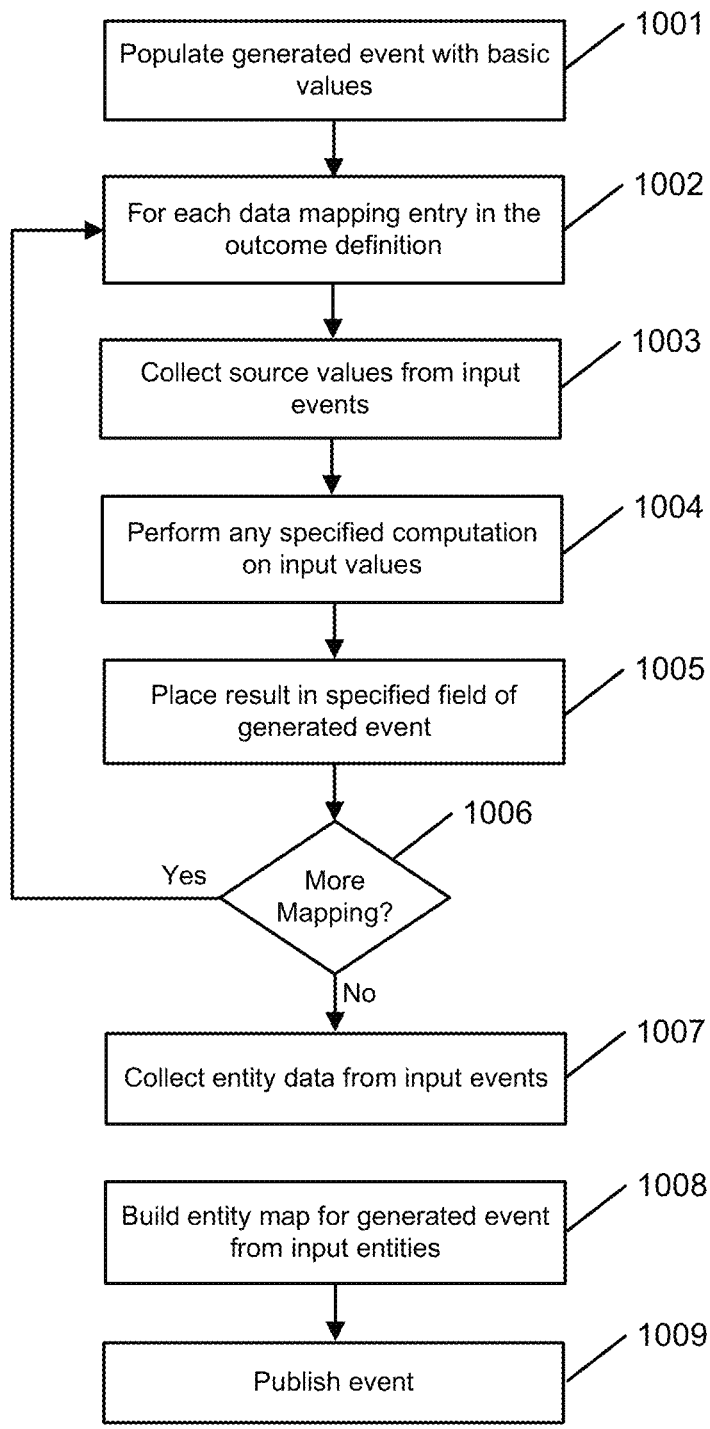
FIG. 10 is a flow diagram illustrating a method to publish an event according to one embodiment.

FIG. 10 is a flow diagram illustrating a method to publish an event according to one embodiment. Process 1000 may be performed by processing logic which may include software, hardware, or a combination thereof. For example, process 1000 may be performed by server 150, e.g., event publishing module 155.

In FIG. 10, event publishing starts with data mapping. In operation 1001, the processing logic may create a skeleton of the event with basic data or values (i.e., unique ID, data type marking, creation time, etc.). In operations 1002 and 1006 collectively, the processing logic iterates for each data mapping entry in the outcome definition. In operation 1003, the processing logic may collect values from the source events referenced in the data mapping entry from those events. In operation 1004, the processing logic performs specified computation on input values. In operation 1005, the processing logic places the result in the generated event. In operation 1006, the processing logic determines whether there is more mapping. If so, the processing returns to operation 1002. Otherwise, the processing logic proceeds to operation 1007 where the processing logic extracts or collects entity data from the input or source events. In operation 1008, the processing logic aggregates or builds the entity data into an entity map, which identifies each entity referenced in the source events and what field it was referenced by. In operation 1009, the processing logic performs any overall computation, such as text indexing, and publishes the event to any external systems (e.g., system 171 of FIG. 1A) and/or back to the system (e.g., server 150).

Constraint Details

Embodiments of the disclosure may support constraints that are "partition" or "relationship" constraints, and allow the constraints to reference fields or aggregations from events as input to the constraints.

The following processes 1100 and 1200 may be applied to the foregoing processes 700 and 800 when combining partial solutions within a constraint joining two event streams. When a constraint is filtering a single event stream a simple comparison of the actual values in each partial solution is sufficient.

Partition constraints ensure that events with different values in a selected field are not in the same solution. This partitions the events into distinct subsets. This is commonly used to ensure all events relate to the same person, location, organization, or activity. For example, a template looking for suspicious travel would look at travel records for a single person, while one looking at maintenance patterns would look at records for a single airline or facility. This constraint operates on equality described in the following paragraph.

Relational constraints restrict solutions to those that have events with values that conform to some relationship. Strict equality is the easiest to test for and can be implemented by placing events in a hash based on this value. This is often the case for unique identifiers or other string values. For numeric values a tolerance can be specified such as ±allowing a fuzzy equality. This is often required of floating point values. For example: A=B±0.5 will find all floating point numbers in B that are within 0.5 of a value in A. This is computed by sorting all values in A and B and testing each value in B for its comparison to the current value in A. Once B is out of range of a value in A, the system moves to the next value of A and continues identifying values in B that are within range of the current value of A. The same method can be used for date time values. For both numeric and date-time values it is possible to allow an offset as in A<B+5±2. In this case the offset causes the values in B to be offset prior to the comparison to A but otherwise operates in the same manner as previously described.

Figure 11:
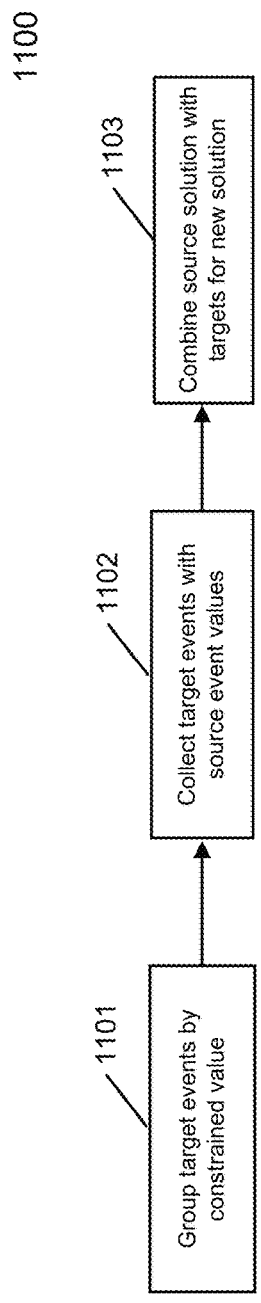
FIG. 11 is a flow diagram illustrating a method to process constraints according to one embodiment.

FIG. 11 is a flow diagram illustrating a method to process constraints according to one embodiment. Process 1100 may be performed by processing logic which may include software, hardware, or a combination thereof. For example, process 1100 may be performed by server 150, e.g., solution generation module 154.

In process 1100, in some embodiments strict equality may be used on string, identifier, or other unique values. In operation 1101, the processing logic groups values in the set of target events by constrained value. In operation 1102, the processing logic iterates each solution and uses source values to collect target events by source event values. In operation 1103, the processing logic combines the source solution with target events for a new solution. That is, each distinct value in the source set results in the new solution output by the constraint. In some embodiments, process 1100 is also used for partition constraints.

Figure 12:
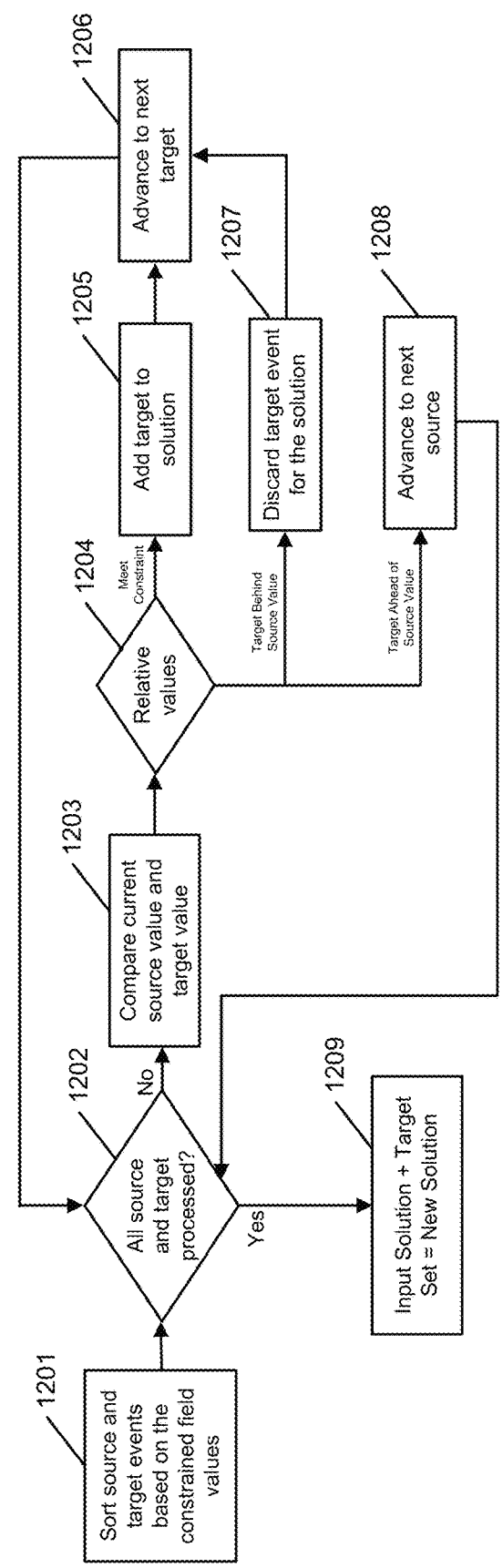
FIG. 12 is a flow diagram illustrating a method to process constraints according to another embodiment.

FIG. 12 is a flow diagram illustrating a method to process constraints (e.g., relational constraints) according to another embodiment. Process 1200 may be performed by processing logic which may include software, hardware, or a combination thereof. For example, process 1200 may be performed by server 150, e.g., solution generation module 154.

Referring to FIG. 12, in operation 1201, the processing logic may sort the source and target events based on the constrained field values being compared. In operation 1201, the processing logic determines whether all source and target events are processed. If all source and target events are processed, the processing logic proceeds to operation 1209 where the new solution is computed by adding the set of target events (or target set) to the input solution. Otherwise, the processing logic proceeds to operations 1203 and 1204 where the processing logic compares the current source event value with the target event value. If the target event value satisfies the constraint, in operation 1205 the processing logic adds the target event value to the target set (or solution), and advances to the next target (operation 1206). If the target event value is behind the current source event value, in operation 1207 the processing logic discards the target event value. If the target event value is ahead of the current source event value, in operation 1208 the processing logic advances to the next source event value, and repeats until all source and target event values have been examined (operations 1202 and 1209).

Figure 13:
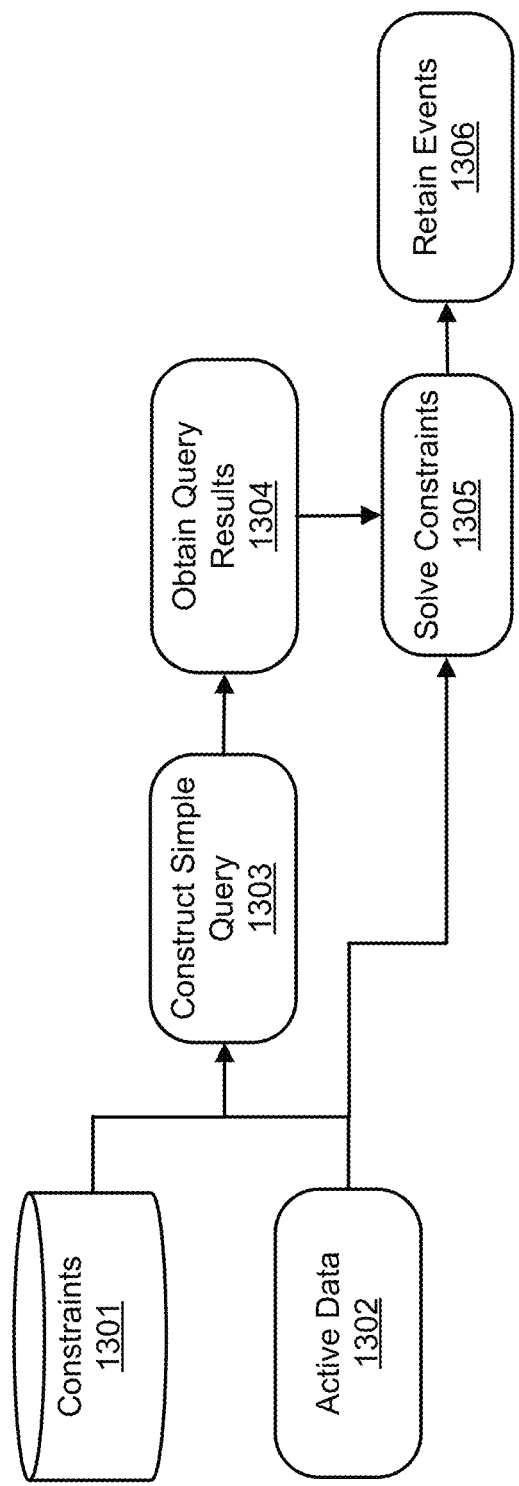
FIG. 13 is a flow diagram illustrating a method of event retention according to one embodiment.

FIG. 13 is a flow diagram illustrating a method of event retention according to one embodiment. Process 1300 may be performed by processing logic which may include software, hardware, or a combination thereof. For example, process 1300 may be performed by server 150, e.g., input data processing module 151.

Referring to FIG. 13, constraints 1301 and active data 1302 (e.g., events) may be used to construct a simple query (in operation 1303). For example, when a constraint 1301 is a simple relational operation (e.g., =, !=, <, <=, >, >=), the query can be constructed to include all constraints between the active data 1302 and passive data. As previously described, constraints between active data 1302 and passive data may be converted into a query term (e.g., constraints between two assertions may be converted into a query). The query term may utilize the values in each of the available events (active or passive events obtained in a preceding query) to construct a target query on a passive data source represented by an assertion being processed. In an embodiment, if there are multiple available events from multiple assertions, the query term may utilize their values with suitable constraints to generate an optimal query. Constraints 1301 may be predefined as part of a pattern of data (active and/or passive) and available at the start of deployment of a system (e.g., system 100 of FIG. 1). This would guide the query construction for each data pattern, and use values from active data 1302 (e.g., active events) to construct the query.

In operation 1304, query results (which may be from a passive data store) representing passive event data may be obtained using the constructed target query. The query results may be streamed into the system (which may be similar to or same as other streaming sources previously described) for constraint solving.

In operation 1305, constraint solving may be performed on the query results. Aspects of the constraint solving have been previously described herein, and for brevity sake, will not be described again.

In operation 1306, event retention may be performed on the query results. In some embodiments, query results (e.g., passive events) that passed constraint solving may be retained for reference. For example, in cases where active inputs allow modification and in more complex cases, query results that passed constraint solving (in operation 1305) are retained for reference. In some embodiments, in cases where this is only one active data source and that data source does not support modification of input events over time, then the processing of the query results can be reactive in nature and does not need to retain any data from the events (e.g., events from a passive source) to resolve the constraints. In cases where the data in the active data can be modified over time (including deletion of events, for example), then the query results can be retained to allow modification of the constraint resolution when active events are revised. In some embodiments, the passive source cannot be re-queried to process the modification because the passive source data may have changed thereby yielding inconsistent results. For example, if an active event is deleted from the data stream, then any passive data related to that event may need to be deleted from the set of events for this pattern and may require a revised output for the pattern as a whole. The same for modification of a value used in constructing a query that may return different events and thus some of the prior events may need to be deleted to adjust for the new value. As an example, if a date field is revised then events selected relative to an old date may no longer match the revised date. In some embodiments, the passive source can be re-queried though in other embodiments, prior results may need to be retained to yield a full and proper result set when the passive source is also being changed.

Figure 14:
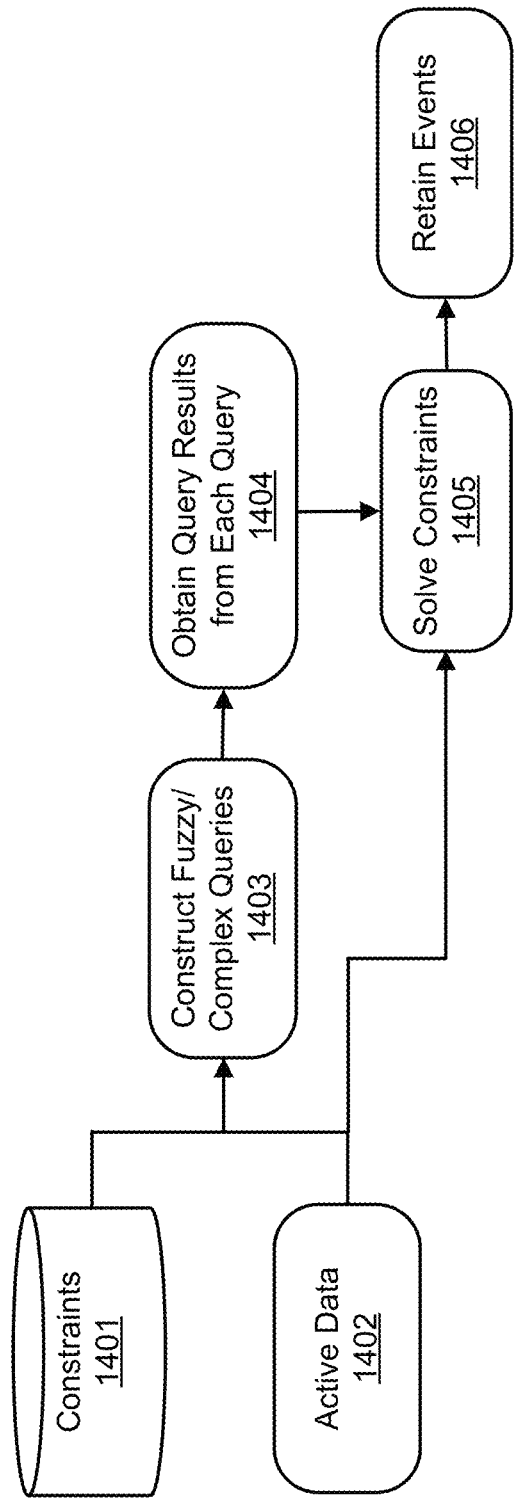
FIG. 14 is a flow diagram illustrating another method of event retention according to one embodiment.

FIG. 14 is a flow diagram illustrating another method of event retention according to one embodiment. Process 1400 may be performed by processing logic which may include software, hardware, or a combination thereof. For example, process 1400 may be performed by server 150, e.g., input data processing module 151.

Referring to FIG. 14, constraints 1401 and active data 1402 (e.g., events) may be used to construct fuzzy or complex queries (in operation 1403). For example, in cases where constraints 1401 are fuzzy with +/− values, multiple query terms may be used to construct a query for each constraint. If the fuzzy aspect is applied to simple relational operators, they may still be combined into a single query with additional query terms. As described above, in cases where the number of result events is limited to optimize the query, then fuzzy terms may be resolved using two queries to obtain events above/below the target value. These can still be combined in simple terms to limit the number of queries or combined with other similar fuzzy queries into n*2 queries (where n is a number of events above/below the target value), for example, for each combination of above/below. In some cases, the order of operations is significant and may be accounted for in constructing the queries.

In cases where constraints 1401 involve more complex operations (e.g., aggregations such as summation (sum), average (avg) functions, or array operations) it may be required that the processing for those constraints be performed after query execution has provided a candidate set of events and all other constraints have been processed. It may also be possible in some passive data stores (e.g., SQL database) to perform a sub-query or preceding query to obtain a value for the aggregation or function value to be used in the primary constraint satisfying query. For example, in a constraint where the sum of event A field 'a' must equal the sum event B field 'a' then a query can be constructed to use all other constraints to obtain the set of A and B that meet all other constraints, and then narrow it down to the set of A and B that have equal sums. For another example, if a constraint exists between A and B that requires a country code to be equal, then an SQL query that computes the sum of A and B by the country code can be run in advance, or as a sub-query, of the constraint query and only those countries that have equal sums need be fetched in the actual constraint query that returns individual events.

In operation 1404, query results (which may be from a passive data store) representing passive event data may be obtained using each constructed query. The query results may be streamed into the system (which may be similar to or same as other streaming sources previously described) for constraint solving.

In operation 1405, constraint solving may be performed on the query results from each constructed query. Aspects of the constraint solving have been previously described herein, and for brevity sake, will not be described again.

In operation 1406, event retention may be performed on the query results from each constructed query. In some embodiments, query results (e.g., events) that passed constraint solving may be retained for reference. For example, in cases where active inputs allow modification and in more complex cases, query results that passed constraint solving (in operation 1405) are retained for reference. In some embodiments, in cases where this is only one active data source and that data source does not support modification of input events over time, then the processing of the query results can be reactive in nature and does not need to retain any data from the events (e.g., events from a passive source) to resolve the constraints. In cases where the data in the active data can be modified over time (including deletion of events, for example), then the query results can be retained to allow modification of the constraint resolution when active events are revised. In some embodiments, the passive source cannot be re-queried to process the modification because the passive source data may have changed thereby yielding inconsistent results. For example, if an active event is deleted then any passive data related to that event may need to be deleted from the set of events for this pattern and may require a revised output for the pattern as a whole. The same for modification of a value used in constructing a query that may return different events and thus some of the prior events may need to be deleted to adjust for the new value. As an example, if a date field is revised then events selected relative to an old date may no longer match the revised date. In some embodiments, the passive source can be re-queried though in other embodiments, prior results may need to be retained to yield a full and proper result set when the passive source is also being changed.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 15:
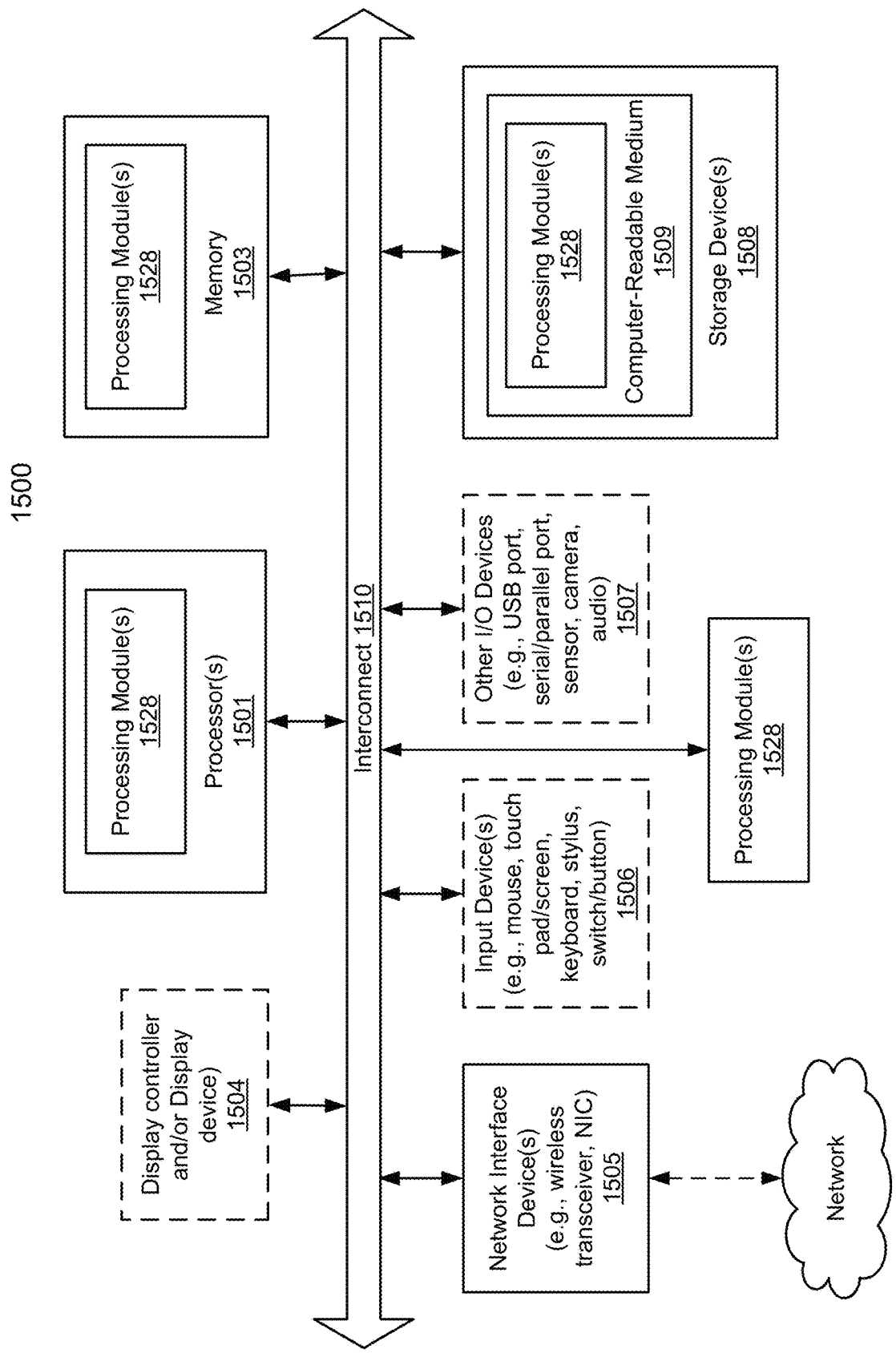
FIG. 15 is a block diagram illustrating a data processing system according to one embodiment.

FIG. 15 is a block diagram illustrating an example of a data processing system which may be used with one embodiment. For example, system 1500 may represent any of data processing systems such as user devices 101-102, server 150, and/or external system 171 described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, input data receiving module 151, event processing module 152, solution generation module 153, outcome processing module 154 and event publishing module 155, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for processing events, comprising:
   receiving event data comprising passive event data, active event data, or both;
   determining whether the received event data is available for a pattern of passive event data and active event data;
   in response to determining that the received event data is available for the pattern of passive event data and active event data, converting one or more constraints between the passive event data and the active event data into one or more query terms;
   using the one or more query terms to construct at least one query;
   obtaining remaining passive event data that is related to some, but not all, of the active event data using the constructed at least one query;
   selecting one or more event definitions that match the event data and the remaining passive event data;
   for each matching event definition, inputting the event definition into a template to generate a set of events, the template including a plurality of assertions and having the event definition as one of the assertions, wherein each assertion includes a constraint;
   progressively processing the constraints of the assertions to produce one or more solutions that are subsets of the set of events; and
   for each constraint and each solution,
      identifying a set of target events that is viable for the solution, and
      producing a new solution based on the solution and the identified set of target events, whereby a set of new solutions is produced.

2. The method of claim 1, wherein obtaining the remaining passive event data comprises:
   obtaining query results using the constructed at least one query,
   performing constraint solving on the query results, and
   retaining the query results, as the remaining passive event data, that pass the constraint solving.

3. The method of claim 1, wherein the one or more query terms are fuzzy terms and the at least one query is two or more queries.

4. The method of claim 1, further comprising:
   performing a preceding query to obtain a value for aggregation or a function value to be used in a constraint satisfying query.

5. The method of claim 1, further comprising:
   revising the pattern of passive event data and active event data by deleting any of the passive event data related to an active event from the active event data when the active event is deleted.

6. The method of claim 1, wherein the active event data is pushed from active data sources and the passive event data is pulled from passive data sources.

7. The method of claim 1, further comprising:
   for each new solution and each outcome in the template,
      determining whether all of the assertions are satisfied,
      in response to determining that all of the assertions are satisfied, determining whether an equivalent outcome has previously triggered, and
      triggering the outcome in response to determining that the equivalent outcome has not previously triggered.

8. The method of claim 7, further comprising:
   in response to determining that at least one assertion is not satisfied and the equivalent outcome has previously triggered, un-triggering the outcome.

9. The method of claim 7, wherein triggering the outcome comprises:
   creating event data from the new solution, and
   publishing the created event data for the new solution.

10. The method of claim 9, wherein publishing the event data of the new solution comprises:
    generating basic data for the new solution,
    for each data mapping entry in the outcome,
       collecting source event values from source events referenced in the data mapping entry,
       performing a computation on the source event values to produce a result, and
       placing the result in the new solution,
    extracting entity data from the source events, and
    aggregating the entity data into an entity map, wherein the entity map identifies each entity referenced in the source events.

11. The method of claim 1, wherein progressively processing the constraints of the assertions comprises:
    ordering partitioning constraints such that each partitioning constraint is preceded by a constraint targeting a source event of the partitioning constraint,
    generating event subsets for the partitioning constraints in sequence, and processing remaining non-partitioning constraints.

12. The method of claim 11, wherein generating the event subsets for the partitioning constraints in sequence comprises:
    for each partitioning constraint,
       separating source events of the partitioning constraint into sets having a same field value referenced by the partitioning constraint, and
       processing non-partitioning constraints originating from a target event of the partitioning constraint in sequence until the non-partitioning constraints encounter the partitioning constraint.

13. The method of claim 1, wherein progressively processing the constraints of the assertions comprises:
    grouping non-partitioning constraints into stages,
    ordering the stages to form a hierarchical data structure,
    placing each event into one of a plurality of partial solutions in each of the assertions having an event definition of the event, wherein the partial solutions are included in the hierarchical data structure,
    separating the partial solutions based on a partition key,
    combining partial solutions having a common partition key to form one or more complete solutions, and
    processing the combined partial solutions for outcome.

14. The method of claim 13, wherein progressively processing the constraints of the assertions further comprises prior to separating the partial solutions based on the partition key, determining whether there are optional stages,
in response to determining that there are optional stages, processing the optional stages including ordering the optional stages such that new input events are processed by one stage and then combined into a partial solution received from a prior stage.

15. The method of claim 13, wherein progressively processing the constraints of the assertions further comprises after separating the partial solutions based on the partition key,
determining whether any of the assertions has a minimum multiplicity greater than one,
in response to determining that no assertion has a minimum multiplicity greater than one,
combining the partial solutions having a common partition key to form one or more complete solutions, and
processing the combined partial solutions for outcome, and
in response to determining that at least one assertion has a minimum multiplicity greater than one, combining the partial solutions and holding the combined partial solutions until a valid or invalid solution is found.

16. The method of claim 13, wherein the partition key is formed based on one or more partition fields of the partial solutions.

17. A data processing system, comprising:
a processor; and
a memory coupled to the processor to store instructions, which when executed by the processor, cause the processor to perform operations, the operations including
receiving event data comprising passive event data, active event data, or both;
determining whether the received event data is available for a pattern of passive event data and active event data;
in response to determining that the received event data is available for the pattern of passive event data and active event data, converting one or more constraints between the passive event data and the active event data into one or more query terms;
using the one or more query terms to construct at least one query;
obtaining remaining passive event data that is related to some, but not all, of the active event data using the constructed at least one query;
selecting one or more event definitions that match the event data and the remaining passive event data;
for each matching event definition, inputting the event definition into a template to generate a set of events, the template including a plurality of assertions and having the event definition as one of the assertions, wherein each assertion includes a constraint;
progressively processing the constraints of the assertions to produce one or more solutions that are subsets of the set of events; and
for each constraint and each solution,
identifying a set of target events that is viable for the solution, and
producing a new solution based on the solution and the identified set of target events, whereby a set of new solutions is produced.

18. The system of claim 17, wherein obtaining the remaining passive event data comprises:
obtaining query results using the constructed at least one query,
performing constraint solving on the query results, and
retaining the query results, as the remaining passive event data, that pass the constraint solving.

19. The system of claim 17, wherein the one or more query terms are fuzzy terms and the at least one query is two or more queries.

20. The system of claim 17, wherein the operations further include:
performing a preceding query to obtain a value for aggregation or a function value to be used in a constraint satisfying query.

21. The system of claim 17, wherein the operations further include:
revising the pattern of passive event data and active event data by deleting any of the passive event data related to an active event from the active event data when the active event is deleted.

22. The system of claim 17, wherein the active event data is pushed from active data sources and the passive event data is pulled from passive data sources.

* * * * *